United States Patent
Kasper

(10) Patent No.: US 12,263,823 B2
(45) Date of Patent: Apr. 1, 2025

(54) BRAKING CONTROL APPARATUS AND METHOD DETERMINING TRAILER BRAKE PRESSURE MODEL BASED ON TRAILER INFORMATION

(71) Applicant: Bendix Commercial Vehicle Systems LLC, Avon, OH (US)

(72) Inventor: Phillip J. Kasper, Elyria, OH (US)

(73) Assignee: BENDIX COMMERCIAL VEHICLE SYSTEM LLC, Avon, OH (US)

( * ) Notice: Subject to any disclaimer, the term of this patent is extended or adjusted under 35 U.S.C. 154(b) by 169 days.

(21) Appl. No.: 18/084,109

(22) Filed: Dec. 19, 2022

(65) Prior Publication Data

US 2024/0198985 A1 Jun. 20, 2024

(51) Int. Cl.
*B60T 8/17* (2006.01)

(52) U.S. Cl.
CPC ....... *B60T 8/1708* (2013.01); *B60T 2270/406* (2013.01)

(58) Field of Classification Search
CPC .......................... B60T 8/1708; B60T 2270/406
See application file for complete search history.

(56) References Cited

U.S. PATENT DOCUMENTS

| | | | | |
|---|---|---|---|---|
| 5,002,343 A * | 3/1991 | Brearley | ............... | B60T 8/1708 188/3 R |
| 5,132,664 A * | 7/1992 | Feldmann | ............... | B60T 17/22 188/1.11 R |
| 5,295,736 A * | 3/1994 | Brearley | ................... | B60T 7/20 303/118.1 |
| 6,273,522 B1 * | 8/2001 | Feetenby | .................. | B60T 8/00 303/9.69 |
| 10,272,890 B2 | 4/2019 | Carritte | | |
| 10,377,356 B2 | 8/2019 | Eckert | | |
| 11,932,225 B1 * | 3/2024 | Kirmaier | ............... | B60T 8/1755 |
| 2012/0312645 A1 | 12/2012 | Frashure | | |
| 2015/0081184 A1 * | 3/2015 | Braunberger | ............. | B60T 7/20 701/70 |
| 2019/0056736 A1 | 2/2019 | Wood et al. | | |

(Continued)

FOREIGN PATENT DOCUMENTS

| | | | | |
|---|---|---|---|---|
| CN | 103661674 B | | 7/2016 | |
| EP | 2570312 A1 * | | 3/2013 | ............ B60T 13/662 |
| WO | 2017097394 A1 | | 6/2017 | |

*Primary Examiner* — George C Jin
(74) *Attorney, Agent, or Firm* — Tucker Ellis LLP

(57) ABSTRACT

Default trailer model data stored in a memory device of a braking control apparatus is used to generate a default trailer braking signal for activating brakes on a default towed vehicle. An application trailer braking model different than the default trailer braking model is determined based on application trailer configuration data alone or in combination with the default trailer braking model. The application trailer configuration data is representative of an application value of an equipment parameter of the towed vehicle. Compensated trailer braking control data is determined by applying primal trailer braking control data representative of a primal trailer braking control signal to the determined application trailer braking model, and an output circuit generates a compensated trailer braking control signal for delivery to a modulator valve that is responsive to the compensated trailer braking control signal to activate brakes on the towed vehicle.

24 Claims, 20 Drawing Sheets

(56) References Cited

U.S. PATENT DOCUMENTS

2019/0084533 A1\* 3/2019 Kasper .................. B60T 13/683
2019/0084534 A1\* 3/2019 Kasper ................ B60R 16/0315
2019/0084540 A1\* 3/2019 Kasper .................... B60T 8/176
2019/0217831 A1 7/2019 Viele \* cited by examiner

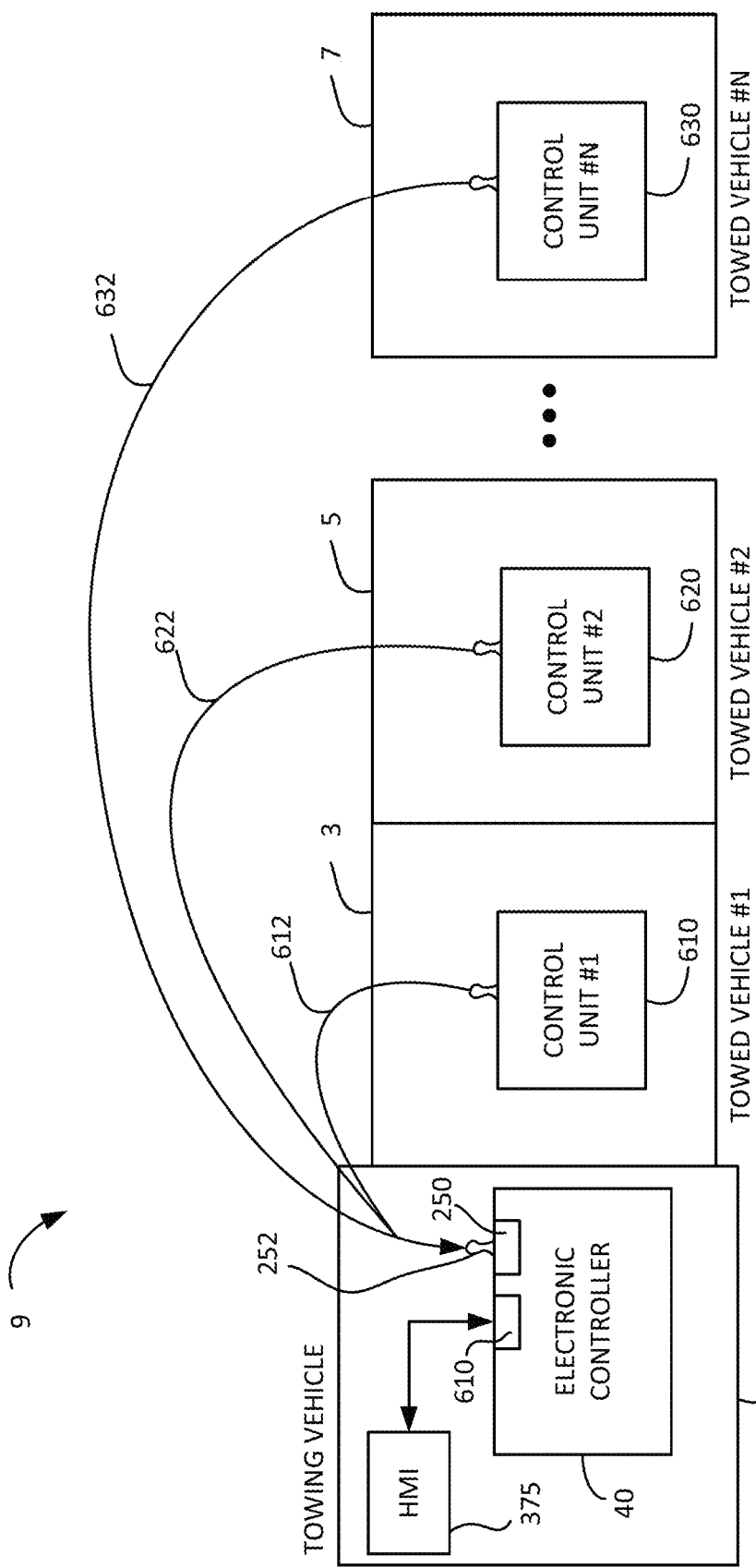

BRAKING CONTROL APPARATUS AND METHOD DETERMINING TRAILER BRAKE PRESSURE MODEL BASED ON TRAILER INFORMATION

TECHNICAL FIELD

The embodiments herein relate generally to brake control apparatus controlling braking operations in combination vehicles of the type including a towing vehicle towing one or more towed vehicles. More specifically, particular embodiments relate to a braking control apparatus of a brake control system that generates a trailer braking signal used by one or more trailer brake pressure valves to control the application of brakes in the one or more towed vehicles based on a characteristic of the trailers.

BACKGROUND

Combination vehicles that include a towing vehicle such as tractor towing one or more towed vehicles such as one or more trailers, dollies or the like, for example, often use various valve devices to regulate the delivery of pressurized air from a source to the respective brakes of the units of the combination vehicle. In this regard, a set of one or more tractor pressure modulators, relays, and/or service valve devices are typically used to regulate the delivery of the pressurized air from the source to the brakes of the tractor and, similarly, a set of one or more trailer pressure modulator, relay, and/or service valve devices are typically used to regulate the delivery of the pressurized air from the air pressure source in the tractor to brakes of the trailers.

For connection to the trailer brakes, a pair of fluid hoses extend between the trailer and the modulator and service valve devices in the towed vehicle. The air hoses are each provided with suitable quick connect couplings such as gladhand connectors or gladhand couplers that provide fluid connections as well as sound mechanic interlocking of the hose coupling, whereby the tractor and trailer braking systems may be easily mutually pneumo-mechanically coupled and uncoupled relative to each other as necessary or desired.

In typical applications, the air hoses include a first or supply hose for delivering pressurized air from the source in the towing vehicle to a supply port of a brake relay valve of the trailer. The pressurized air is delivered from the source to the trailer brake relay valve via the trailer pressure modulator and service valve devices. That is, relative to the air supply line, typically, the trailer pressure modulator and service valve devices are operatively disposed between the pressurized air source and the trailer brake relay valve, and the pair of fluid hoses are used to couple the pressurized air source with the trailer brake relay valve. In that way, the trailer pressure modulator and service valve devices may interrupt the flow of escaping compressed air if a line in the trailer is ruptured or the like. The trailer pressure modulator and service valve devices may perform other functions relative to the air supply as well, but under normal operating conditions the supply port of the trailer brake relay valve is essentially supplied with the full pressure of the supply without interruption from the supply port of a brake relay valve.

The air hoses in these applications further include a second or control hose or fluid line for delivering a pneumatic control signal in the form of an air pressure control signal from the trailer pressure modulator and multi-pressure valve devices to a control port of the brake relay valve in the trailer. The brake relay valve in the trailer is responsive to the pneumatic control signal received from the trailer pressure modulator and service valve devices to selectively apply the supply air pressure to devices on the trailer the activate the trailer brakes based on the level of air pressure delivered via the control hose. In that way, the trailer pressure modulator and service valve devices both on the towing vehicle control the braking in the trailer, essentially by varying the pressure delivered to the control port in the brake relay valve in the trailers via the control hose. A higher air pressure delivered to the control port of the brake relay valve from the trailer pressure modulator and service valve devices controls the brakes in the trailer to actuate the brake to a higher degree thereby braking the trailer more aggressively. Conversely, a lower air pressure delivered to the control port of the brake relay valve from the trailer pressure modulator and service valve devices controls the brakes in the trailer to actuate the brake to a lower degree thereby braking the trailer less aggressively.

The trailer pressure modulator and service valve devices disposed in the tractor are responsive to one or more electrical brake command signals received from an electronic control unit (ECU) of the tractor to adjust the level of air pressure delivered to the control port of the trailer brake relay valve. In that sense, the trailer pressure modulator and service valve devices act as signal conversion mechanisms for converting the one or more electrical brake command signals into an air pressure control signal suitable for use by the brake relay valve disposed in the trailer.

In general, it is desirable for the pressure level and timing of the air pressure control signal actually realized at the control port of the trailer brake relay valve to have a level and a timing that closely follows or tracks with the level and timing of a primal braking command signal developed within the ECU of the tractor. In practice, however, it is not possible to directly express the electronic primal braking control signal developed within the ECU of the tractor as an air pressure control signal received by the brake relay valve of the trailer with a high degree of fidelity. The timing and/or level of the physical air pressure control signal actually realized at the trailer brake relay valve cannot be expected to exactly adequately match a timing and/or level of the air pressure control signal desired to occur at the brake relay valve owing to the inherent nature of pneumatic control signal propagation relative to equivalent electrical control signals within the ECU, and also owing to the physical characteristics of the pneumatic braking control system of the trailer in general.

For this reason, braking controllers have been developed that use a generic trailer braking model in an attempt to compensate for various timing delays, losses, and other non-linearities that inherently arise from using an air pressure control signal as a proxy for an electrical signal to control brakes of a trailer of a combination vehicle. The generic trailer braking model is used by the electronic braking controller to essentially convert the electronic primal trailer braking control signal developed within the ECU of the tractor into a compensated pneumatic trailer braking control signal, wherein instead of delivering the electronic primal braking control signal directly to the trailer pressure modulator and multi-pressure valve devices, the compensated pneumatic braking control signal is delivered to the trailer pressure modulator device. In that way many of the various timing delays, losses, and other non-linearities that inherently arise from using the air pressure control signal as a proxy for an electrical signal to control the trailer brakes may be compensated for through use of a suitable predetermined mapping function provided by the generic trailer braking model.

Although braking controllers that use a generic trailer braking model to compensate for the various timing delays, losses, and other non-linearities that inherently arise in systems such as described above, there are several deficiencies. As mentioned, the generic trailer braking model maps an electronic primal braking control signal developed within the ECU of the tractor to a compensated braking control signal for application of the compensated braking control signal to the trailer pressure modulator device. In that way, the air pressure control signal actually realized at the control port of the trailer brake relay valve may better approximate the level and timing characteristics of the primal braking control signal. However, the equipment that couples the trailer pressure modulator and multi-pressure valve devices with the control port of the trailer brake relay valve is typically different for different trailers. In this connection, braking controllers that use a generic trailer braking model essentially use a default trailer braking model that was developed to address the electronic signal to pneumatic signal conversion inefficiencies in a typical or otherwise generic trailer and, accordingly, the use of such default trailer braking model has a limited range of applications.

By way of example, a longer time period is needed to deliver an air pressure braking control signal to a brake relay valve at the end on a long, e.g. 53' trailer, than would be needed to deliver the same air pressure braking control signal to a brake relay valve on a short, e.g. 13' trailer. This timing discrepancy is even more pronounced for tractors that tow multiple trailers (so called "doubles" or "triples") in the combination vehicle. Heretofore, the generic trailer braking model has been used to accommodate a "standardized" single trailer having an intermediate length that is not expected to be either 53' or 13' exactly.

In addition and in practice, the pressure level of the air pressure control signal to the brake relay valve at the end of a long, e.g. 53' trailer may be substantially less than is needed to deliver an adequate air pressure control signal. The original level of the signal may be substantially degraded at the end of a long trailer owing to the simple physics of communicating pneumatic signals in hoses. This signal level discrepancy is even more pronounced for tractors that tow multiple trailers in the combination vehicle.

While the default trailer braking model provides some benefit over the use of the electronic primal braking control signal converted to a pneumatic signal directly, this solution lacks the ability to address the condition that any given tractor may tow one or more towed vehicles that have vastly different physical sizes and/or constructions. The generic trailer braking model is, essentially, a compromise.

SUMMARY OF THE EXAMPLE EMBODIMENTS

The embodiments herein provide for new and improved systems and methods for providing a trailer brake control of one or more towed vehicles of a combination vehicle.

The embodiments herein relate generally to brake controls in a combination vehicle including a towing vehicle towing one or more towed vehicles.

The embodiments herein relate generally to a braking control apparatus that generates a trailer braking signal used by a brake pressure modulator to control the application of brakes in one or more towed vehicles.

The embodiments herein provide a system and method for selecting a trailer brake pressure model that is different than a generic or otherwise standard or standardized trailer braking model.

The embodiments herein provide a system and method for selecting a trailer brake pressure model that is different than a generic or otherwise standard or standardized trailer braking model based on trailer information.

The embodiments herein provide an adaptive control of a brake pressure modulator.

The embodiments herein provide an adaptive control of a brake pressure modulator by determining a brake pressure model based on trailer information.

The embodiments herein provide an adaptive control of a brake pressure modulator by determining a brake pressure model based on trailer information.

The embodiments herein provide control of a trailer brake pressure modulator using adaptive brake pressure model.

The embodiments herein provide control of a trailer brake pressure modulator using adaptive brake pressure model based on trailer information.

In accordance with a first aspect, a brake control system of an associated towing vehicle towing a towed vehicle as a combination vehicle comprises a braking control apparatus and a modulator valve that is responsive to a compensated trailer braking control signal developed by the braking control apparatus in accordance with an application trailer braking model. The application trailer braking model is determined by the braking control apparatus based on trailer configuration data received by the braking control apparatus to activate brakes on the towed vehicle in response to the compensated trailer braking control signal received by the modulator valve, wherein the application trailer configuration data is representative of an application value of an equipment parameter of the towed vehicle. Thereby, the operation of the modulator valve and the brakes of the trailer are particularly tailored to one or more specific characteristics of the towed vehicle.

In accordance with a further aspect, a braking control apparatus is provided for use in a brake control system of an associated towing vehicle towing a towed vehicle as a combination vehicle, the brake control system of the associated towing vehicle comprising the braking control apparatus and a modulator valve that is responsive to the compensated trailer braking control signals from the braking control apparatus to activate brakes on the towed vehicle based on the compensated trailer braking control signal. The braking control apparatus includes a processor, a non-transient memory device operatively coupled with the processor, and an output circuit. The non-transient memory device stores default trailer model data representative of a default trailer braking model used by the braking control apparatus to generate a default trailer braking control signal used to activate brakes on a default towed vehicle, and control logic. The control logic is executable by the processor to determine an application trailer braking model different than the default trailer braking model based on the default trailer braking model and the received application trailer configuration data. The application trailer configuration data is representative of an application value of an equipment parameter of the towed vehicle. The control logic is further executable by the processor to determine compensated trailer braking control data by applying primal trailer braking control data representative of a primal trailer braking control signal to the determined application trailer braking model. The output circuit is responsive to the compensated trailer braking control data to generate a compensated trailer braking control signal for delivery to a modulator valve of the brake control system of the associated towing vehicle that is responsive to the compensated trailer braking control signal to activate brakes on the towed vehicle based on the compensated trailer braking control signal.

In an embodiment, the control logic of the braking control apparatus of any of the embodiments is executable by the processor to determine, based on the brake controller not receiving the application trailer configuration data, default trailer braking control data by applying the primal trailer braking control data representative of the primal trailer braking control signal to the default trailer braking model. In the embodiment, the output circuit is responsive to the default trailer braking control data to generate the default trailer braking control signal for delivery to the modulator valve of the brake control system of the associated towing vehicle that is responsive to the default trailer braking control signal to activate the brakes on the towed vehicle based on the default trailer braking control signal.

In an embodiment, the control logic of any of the embodiments is executable by the processor to determine the application trailer braking model based on the application trailer configuration data received by the brake controller by selecting the application trailer braking model from a plurality of application trailer braking models stored in the non-transient memory device based on the application trailer configuration data received by the brake controller.

In an embodiment, the control logic of any of the embodiments is executable by the processor to select the application trailer braking model from the plurality of application trailer braking models stored in the non-transient memory device based on determining that the application value of the equipment parameter of the towed vehicle represented by the application trailer configuration data is within a first predetermined range.

In an embodiment, the non-transient memory device of any of the embodiments stores a default value of the equipment parameter corresponding to the default trailer model data representative of the default trailer braking model used by the braking control apparatus to generate the default trailer braking signal used to activate brakes on the default towed vehicle having the default value of the equipment parameter, and the control logic is executable by the processor to determine the application trailer braking model based on the default trailer braking model and the application trailer configuration data by determining a difference between the default value of the equipment parameter and the application value of the equipment parameter, and modifying the default trailer braking model to generate the application trailer braking model by applying the difference to the default trailer braking model using a modification function.

In an embodiment, the control logic of any of the embodiments is executable by the processor to determine the application trailer braking model based on the default trailer braking model and the application trailer configuration data by modifying the default trailer braking model to generate the application trailer braking model by applying the application value of the equipment parameter to the default trailer braking model using a modification function.

In an embodiment, the braking control apparatus of any of the embodiments further comprises a controller manual input operatively coupled with the processor, the controller manual configuration input receiving a manual trailer configuration signal provided by an associated operator of the associated towing vehicle, the manual trailer configuration signal comprising the application trailer configuration data representative of the application value of the equipment parameter of the towed vehicle.

In an embodiment, the braking control apparatus of any of the embodiments further comprises a controller automatic input operatively coupled with the processor, the controller automatic configuration input receiving an automatic trailer configuration signal from an associates source external to the associated combination vehicle and external to the braking control apparatus, the automatic trailer configuration signal comprising the application trailer configuration data representative of the application value of the equipment parameter of the towed vehicle.

In accordance with a second aspect, a method is provided in a brake control system comprising a braking control apparatus and a modulator valve of an associated towing vehicle towing a towed vehicle as a combination vehicle. The method generates a compensated trailer braking control signal that the modulator valve is responsive to for activating brakes on the towed vehicle. The method comprises developing the compensated trailer braking control signal by the braking control apparatus in accordance with an application trailer braking model determined by the braking control apparatus based on trailer configuration data received by the braking control apparatus. The application trailer configuration data is representative of an application value of an equipment parameter of the towed vehicle. Thereby, the operation of the modulator valve and the brakes of the trailer are particularly tailored to one or more specific characteristics of the towed vehicle.

In accordance with a further aspect, a method is provided in a brake control system of an associated towing vehicle for generating a compensated trailer braking control signal to activate brakes on a towed vehicle being towed by the associated towing vehicle as a combination vehicle. Default trailer model data is stored in a non-transient memory device operatively coupled with a processor of a braking control apparatus of the brake control system. The default trailer model data is representative of a default trailer braking model used by the braking control apparatus to generate a default trailer braking control signal used to activate brakes on a default towed vehicle. The processor executes control logic stored in the non-transient memory device to determine an application trailer braking model different than the default trailer braking model based on application trailer configuration data received by the brake controller, or the default trailer braking model and the received application trailer configuration data. The application trailer configuration data is representative of an application value of an equipment parameter of the towed vehicle. The processor further executes control logic stored in the non-transient memory device to determine compensated trailer braking control data by applying primal trailer braking control data representative of a primal trailer braking control signal to the determined application trailer braking model. The output circuit generates a compensated trailer braking control signal responsive to the compensated trailer braking control data. The compensated trailer braking control signal is delivered to a modulator valve of the brake control system of the associated towing vehicle that is responsive to the compensated trailer braking control signal to activate. The modulator valve of the brake control system of the associated towing vehicle that is responsive to the compensated trailer braking control signal to activate brakes on the towed vehicle based on the compensated trailer braking control signal.

In an embodiment, the executing the control logic by the processor of any of the embodiments comprises executing the control logic by the processor of the braking control apparatus of the brake control system based on the brake controller not receiving the application trailer configuration data to determine default trailer braking control data by applying the primal trailer braking control data representative of the primal trailer braking control signal to the default trailer braking model, wherein the method further comprises generating by the output circuit responsive to the default trailer braking control data the default trailer braking control signal for delivery to the modulator valve of the brake control system of the associated towing vehicle that is responsive to the default trailer braking control signal to activate the brakes on the towed vehicle based on the default trailer braking control signal.

In an embodiment, the executing the control logic by the processor of any of the embodiments comprises executing the control logic by the processor of the braking control apparatus of the brake control system to determine the application trailer braking model by executing the control logic by the processor to determine the application trailer braking model based on the application trailer configuration data received by the brake controller by selecting the application trailer braking model from a plurality of application trailer braking models stored in the non-transient memory device based on the application trailer configuration data received by the brake controller.

In an embodiment, the executing the control logic by the processor of any of the embodiments comprises executing the control logic by the processor of the braking control apparatus of the brake control system to select the application trailer braking model by executing the control logic by the processor to select the application trailer braking model from the plurality of application trailer braking models stored in the non-transient memory device based on determining that the application value of the equipment parameter of the towed vehicle represented by the application trailer configuration data is within a first predetermined range.

In an embodiment, the method of any of the embodiments further comprises storing a default value of the equipment parameter corresponding to the default trailer model data in the non-transient memory device, wherein the default value of the equipment parameter corresponding to the default trailer model data representative of the default trailer braking model used by the braking control apparatus to generate the default trailer braking signal used to activate brakes on the default towed vehicle having the default value of the equipment parameter, wherein the executing the control logic by the processor comprises executing the control logic by the processor to determine the application trailer braking model based on the default trailer braking model and the application trailer configuration data by determining a difference between the default value of the equipment parameter and the application value of the equipment parameter, and modifying the default trailer braking model to generate the application trailer braking model by applying the difference to the default trailer braking model using a modification function.

In an embodiment, the executing the control logic by the processor of any of the embodiments comprises executing the control logic by the processor of the braking control apparatus of the brake control system to determine the application trailer braking model based on the default trailer braking model and the application trailer configuration data comprises modifying the default trailer braking model to generate the application trailer braking model by applying the application value of the equipment parameter to the default trailer braking model using a modification function.

In an embodiment, the method of any of the embodiments further comprises receiving a manual trailer configuration signal provided by an associated operator of the associated towing vehicle via a controller manual input operatively coupled with the processor, the manual trailer configuration signal comprising the application trailer configuration data representative of the application value of the equipment parameter of the towed vehicle.

In an embodiment, the method of any of the embodiments further comprises receiving an automatic trailer configuration signal from an associates source external to the associated combination vehicle and external to the braking control apparatus via a controller automatic input operatively coupled with the processor, the automatic trailer configuration signal comprising the application trailer configuration data representative of the application value of the equipment parameter of the towed vehicle.

In accordance with a third aspect, a non-transient computer readable medium is provided storing instructions thereon that when executed by a processor of a braking control apparatus of a brake control system comprising the braking control apparatus and a modulator valve of an associated towing vehicle towing a towed vehicle as a combination vehicle, performs a method generating a compensated trailer braking control signal that the modulator valve is responsive to for activating brakes on the towed vehicle. The method comprises developing the compensated trailer braking control signal by the braking control apparatus in accordance with an application trailer braking model determined based on trailer configuration data received by the braking control apparatus. The application trailer configuration data is representative of an application value of an equipment parameter of the towed vehicle. Thereby, the operation of the modulator valve and the brakes of the trailer are particularly tailored to one or more specific characteristics of the towed vehicle.

In accordance with yet a further aspect, a non-transient computer readable medium is provided storing instructions thereon that when executed by a processor of a braking control apparatus of a brake control system of an associated towing vehicle performs a method for generating a compensated trailer braking control signal to activate brakes on a towed vehicle being towed by the towing vehicle as a combination vehicle. Default trailer model data is stored in a non-transient memory device operatively coupled with a processor of a braking control apparatus. The default trailer model data is representative of a default trailer braking model used by the braking control apparatus to generate a default trailer braking signal used to activate brakes on a default towed vehicle. The processor executes control logic stored in the non-transient memory device to determine an application trailer braking model different than the default trailer braking model based on application trailer configuration data received by the brake controller, or the default trailer braking model and the application trailer configuration data. The application trailer configuration data is representative of an application value of an equipment parameter of the towed vehicle. The processor further executes control logic stored in the non-transient memory device to determine compensated trailer braking control data by applying primal trailer braking control data representative of a primal trailer braking control signal to the determined application trailer braking model. The output circuit generates a compensated trailer braking control signal responsive to the compensated trailer braking control data. The compensated trailer braking control signal is delivered to a modulator valve of the brake control system of the associated towing vehicle that is responsive to the compensated trailer braking control signal to activate. The modulator valve of the brake control system of the associated towing vehicle that is responsive to the compensated trailer braking control signal to activate brakes on the towed vehicle based on the compensated trailer braking control signal.

In an embodiment, the determining the application trailer braking model in any of the embodiments comprises executing the control logic by the processor of the braking control apparatus of the brake control system based on the brake controller not receiving the application trailer configuration data to determine default trailer braking control data by applying the primal trailer braking control data representative of the primal trailer braking control signal to the default trailer braking model, wherein the method further comprises generating by the output circuit responsive to the default trailer braking control data the default trailer braking control signal for delivery to the modulator valve of the brake control system of the associated towing vehicle that is responsive to the default trailer braking control signal to activate the brakes on the towed vehicle based on the default trailer braking control signal.

In an embodiment, the determining the application trailer braking model in any of the embodiments comprises executing the control logic by the processor to determine the application trailer braking model based on the application trailer configuration data received by the brake controller by selecting the application trailer braking model from a plurality of application trailer braking models stored in the non-transient memory device based on the application trailer configuration data received by the brake controller.

In an embodiment, the selecting the application trailer braking model in any of the embodiments comprises executing the control logic by the processor to select the application trailer braking model from the plurality of application trailer braking models stored in the non-transient memory device based on determining that the application value of the equipment parameter of the towed vehicle represented by the application trailer configuration data is within a first predetermined range.

In an embodiment, the instructions that when executed by the processor of the braking control apparatus performs a method further comprising in any of the embodiments storing a default value of the equipment parameter corresponding to the default trailer model data in the non-transient memory device, wherein the default value of the equipment parameter corresponding to the default trailer model data representative of the default trailer braking model used by the braking control apparatus to generate the default trailer braking signal used to activate brakes on the default towed vehicle having the default value of the equipment parameter, wherein the executing the control logic by the processor comprises executing the control logic by the processor to determine the application trailer braking model based on the default trailer braking model and the application trailer configuration data by determining a difference between the default value of the equipment parameter and the application value of the equipment parameter, and modifying the default trailer braking model to generate the application trailer braking model by applying the difference to the default trailer braking model using a modification function.

In an embodiment, the executing the control logic by the processor to determine the application trailer braking model based on the default trailer braking model and the application trailer configuration data comprises in any of the embodiments modifying the default trailer braking model to generate the application trailer braking model by applying the application value of the equipment parameter to the default trailer braking model using a modification function.

In an embodiment, the instructions that when executed by the processor of the braking control apparatus performs a method further comprising in any of the embodiments receiving a manual trailer configuration signal provided by an associated operator of the associated towing vehicle via a controller manual input operatively coupled with the processor, the manual trailer configuration signal comprising the application trailer configuration data representative of the application value of the equipment parameter of the towed vehicle.

In an embodiment, the instructions that when executed by the processor of the braking control apparatus performs a method further comprising in any of the embodiments receiving an automatic trailer configuration signal from an associates source external to the associated combination vehicle and external to the braking control apparatus via a controller automatic input operatively coupled with the processor, the automatic trailer configuration signal comprising the application trailer configuration data representative of the application value of the equipment parameter of the towed vehicle.

The various examples described above can be combined with each other in various ways in further examples.

It is to be understood that the features mentioned above and those yet to be explained below may be used not only in the respective combinations indicated, but also in other combinations or in isolation without departing from the scope of the invention.

Other aspects, embodiments, features and advantages of the example embodiments will become apparent from the following description of the embodiments, taken together with the accompanying drawings, which illustrate, by way of example, the principles of the example embodiments.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

FIGS. 9A and 9B are diagrammatic showings of a wireless communication connection between the towing vehicle and several towed vehicles, and further showing local and remote towed vehicle configuration communication.

DETAILED DESCRIPTION OF THE EXAMPLE EMBODIMENTS

In the following description of the present invention reference is made to the accompanying figures which form a part thereof, and in which are shown, by way of illustration, exemplary embodiments illustrating the principles of the present invention and how it is practiced. Other embodiments can be utilized to practice the present invention and structural and functional changes can be made thereto without departing from the scope of the present invention.

Figure 1:
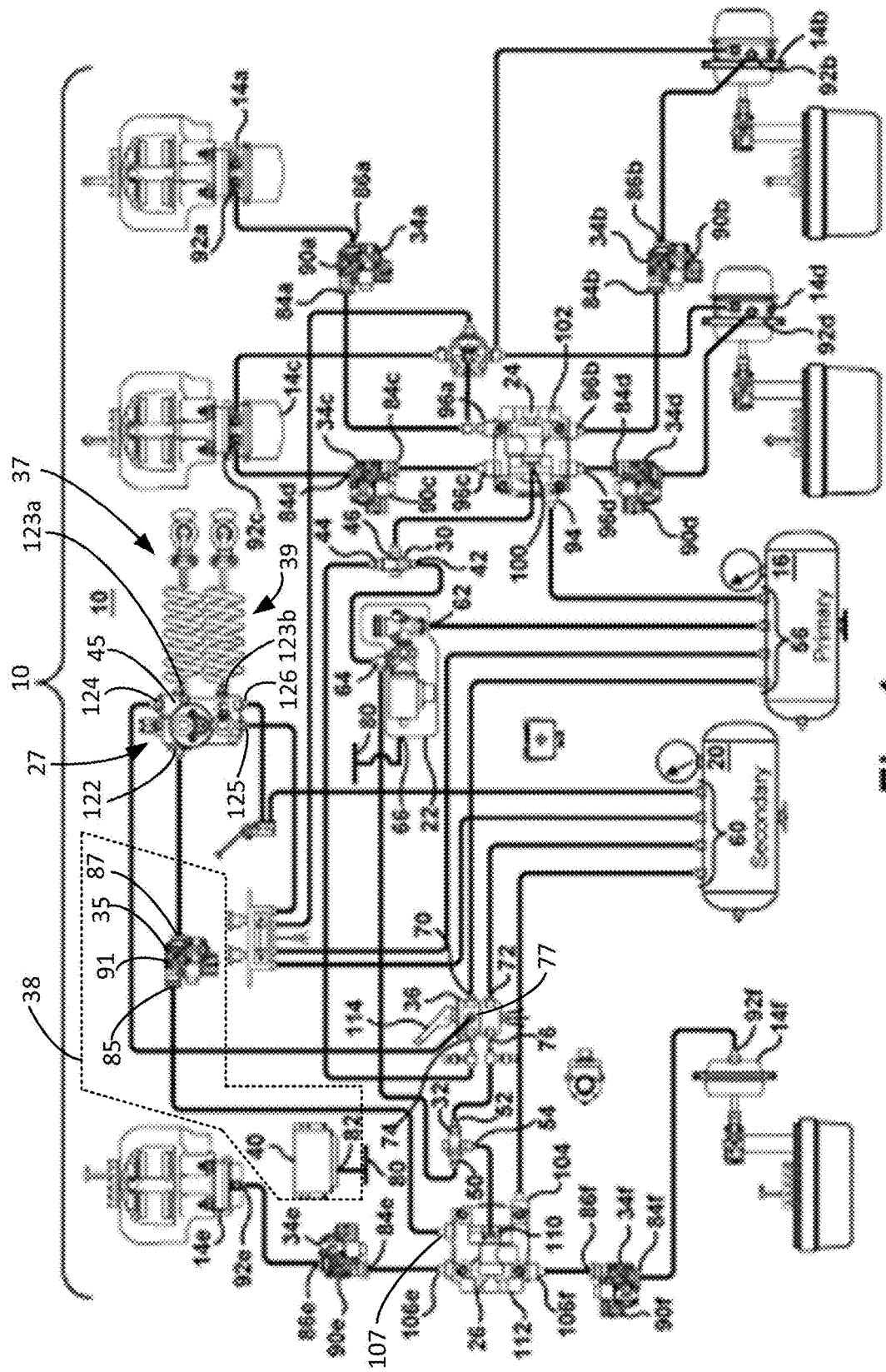
FIG. 1 illustrates a schematic representation of a trailer brake control system in a brake system of a towing vehicle, wherein the trailer brake control system includes a trailer braking control apparatus and a modulator valve in accordance with an example embodiment.

Referring now to the drawings, wherein the showings are for the purpose of illustrating the example embodiments only, and not for purposes of limiting the same, FIG. 1 illustrates a brake system 10 that determines trailer brake pressure models based on application trailer configuration data representative of one or more application value of an equipment parameter of a towed vehicle. The example brake system 10 is shown being disposed in an associated towing vehicle 1 (FIG. 2) towing one or more associated towed vehicles 3, 5, 7 (FIG. 2) by way of an example application. The towing vehicle 1 may be referred to herein equivalently as a "tractor," and the one or more towed vehicles may be referred to herein equivalently as one or more "trailers." Although shown as a tractor of a commercial vehicle combination vehicle, it is to be appreciated that the associated towing vehicle 1 may be any type of vehicle adapted to pull, push, or otherwise motivate the motion of one or more associated vehicles operatively coupled with the towing vehicle. Similarly it is to be appreciated that the one or more associated towed vehicles may be any type of vehicles adapted to be pulled, pushed, or otherwise moved by an associated to wing vehicle operatively coupled with the one or more associated towed vehicles.

In the illustrated embodiment, the brake system 10 is a pneumatic (e.g., air) brake system. The brake system 10 includes at least one service brake $14_{a,b,c,d,e,f}$ (collectively 14), a first reservoir 16, a second reservoir 20, a control valve 22, a first relay valve 24, a second relay valve 26, a trailer service valve 27, a first shuttle valve 30, a second shuttle valve 32, at least one tractor modulator valve $34_{a,b,c,d,e,f}$ (collectively 34), at least one trailer modulator valve 35, an operator controlled brake demand valve 36 (e.g., a foot brake valve), and a braking control apparatus 40 (e.g., controller or electronic control unit (ECU)). In an implementation, a brake control system 38 comprises the braking control apparatus 40 and the at least one trailer modulator valve 35. In a further implementation, a novel braking control apparatus 40 controls an associated at least one trailer modulator valve 35 of an associated brake control system 38 in an associated brake system 10 of an associated towing vehicle 1. In the illustrated embodiment, each of the first and second relay valves 24, 26 and the trailer service valve 27 may be associated with respective braking modulator valves, wherein the first relay valve 24 is associated with modulator valves $34_{a,b,c,d}$, the second relay valve 26 is associated with modulator valves $34_{e,f}$, and the trailer service valve 27 is associated with the trailer modulator valve 35. The trailer service valve 27 may be a series of double check valves. In the example embodiment described herein, the braking control apparatus 40 together with the trailer modulator valve 35 comprise a brake control system 38, wherein the braking control apparatus 40 is operable in the brake control system 38 of the brake system 10 of the associated towing vehicle 1 towing one or more towed vehicles 3, 5, 7 as a combination vehicle 9. In particular, the braking control apparatus 40 is operable in ways to be described herein to select or otherwise determine or formulate a trailer brake pressure model based on trailer information relating to one or more parameters of the one or more towed vehicles 3, 5, 7 forming the combination vehicle 9.

The first and second reservoirs 16, 20 store pneumatic fluid (e.g., air) at a full system pressure (e.g., between ≈110 psi and ≈130 psi and, in one particular example, ≈120 psi). As is commonly understood, the pneumatic fluid in the reservoirs 16, 20 is replenished by a compressor (not shown) as it is used or otherwise depleted.

The first shuttle valve 30 includes first and second supply ports 42, 44 and a delivery port 46; and the second shuttle valve 32 includes first and second supply ports 50, 52 and a delivery port 54. The higher of the two (2) pneumatic pressures at the first and second supply ports 42, 44, respectively, of the first shuttle valve 30 is fluidly communicated to the delivery port 46 of the first shuttle valve 30. Similarly, the higher of the two (2) pneumatic pressures at the first and second supply ports 50, 52, respectively, of the second shuttle valve 32 is fluidly communicated to the delivery port 54 of the second shuttle valve 32.

The first and second reservoirs 16, 20 include respective delivery ports 56, 60. The control valve 22 includes a pneumatic supply port 62, a pneumatic delivery port 64 and an electronic control port 66.

The operator controlled brake demand valve 36 includes first and second supply ports 70, 72, respectively, and first, second, and third delivery ports 74, 76, 77 respectively. The first supply port 70 of the operator controlled brake demand valve 36 fluidly communicates with the delivery port 56 of the first reservoir 16. The second supply port 72 of the operator controlled brake demand valve 36 fluidly communicates with the delivery port 60 of the second reservoir 20. The first delivery port 74 of the operator controlled brake demand valve 36 fluidly communicates with the second supply port 44 of the first shuttle valve 30. The second delivery port 76 of the operator controlled brake demand valve 36 fluidly communicates with the second supply port 52 of the second shuttle valve 32. The third deliver port 77 of the operator controlled brake demand valve 36 fluidly communicates with a supply port 45 of the trailer service valve 27.

The delivery port 56 of the first reservoir 16 fluidly communicates with the supply port 62 of the control valve 22. The delivery port 64 of the control valve 22 fluidly communicates with the first supply port 42 of the first shuttle valve 30. The delivery port 64 of the control valve 22 also fluidly communicates with the first supply port 50 of the second shuttle valve 32. The electronic control port 66 of the control valve 22 electrically communicates with the braking control apparatus 40 via, for example, a direct wired electrical connection such as for example via a suitable tractor wiring harness, wiring bundles, or the like. For ease of illustration, none of the wired connections between the braking control apparatus 40 and any of the controlled brake devices or between the braking control apparatus 40 and any devices providing signals to the braking control apparatus 40 are shown. In the example embodiment, the braking control apparatus 40 is in operative communication with one or more further vehicle control systems (not shown) of the associated towing vehicle 1 such as for example a tractor electronic control unit (ECU) via a vehicle communication bus 80 (e.g., a J1939 communication bus). For ease of illustration, only a portion of the vehicle communication bus 80 is shown. In the example embodiments herein, the braking control apparatus 40 may receive braking control signals from the tractor ECU of the associated towing vehicle 1 via the vehicle communication bus 80. The braking control signals may be in the form for example of deceleration command signals. In a typical application of the subject embodiments, the braking control apparatus 40 receives deceleration command signals from the tractor ECU via the vehicle communication bus 80 during autonomous operation of the associated towing vehicle 1, during driver-assist operation of the associated towing vehicle 1, during autonomous platooning operation of the associated towing vehicle 1, or the like.

The braking control apparatus 40 electronically communicates with the vehicle communication bus 80 in the illustrated example via an electronic ECU communication line (e.g., wire) 82. In addition, the braking control apparatus 40 electronically communicates with the at least one trailer modulator valve 35 in the illustrated example via a suitable communication line such as for example a wire harness or the like.

The control valve 22 may be set to one of a plurality of states based on an electronic control signal received from the braking control apparatus 40, via the tractor wiring bundle (not shown) at the electronic control port 66. In one embodiment, the control valve 22 is set to either a closed (e.g., first) state or an open (e.g., second) state. During the closed state, the supply port 62 does not fluidly communicate with the delivery port 64. During the open state, the supply port 62 fluidly communicates with the delivery port 64, but reduces the pressure of the pneumatic fluid received at the supply port 62 before the pneumatic fluid reaches the delivery port 64. For example, the control valve 22 reduces the pressure of the pneumatic fluid from the full system pressure as received at the supply port 62 to a reduced pressure that is delivered by the delivery port 64. It is contemplated that the reduced pressure may be $\leq \approx 80$ psi, and in one particular example $\leq \approx 55$ psi.

In one embodiment, the control valve 22 is a normally closed valve, in other words, the default state of the control valve 22 is the closed state. In this embodiment, the control valve 22 remains in the closed state as long as no control signal is actively being received at the electronic control port 66. The control valve 22 only switches to, and remains in, the open state while the control signal is actively being received at the electronic control port 66. Otherwise, with no control signal present at the electronic control port 66, the control valve 22 is in the closed state.

Each of the modulators $34_{a,b,c,d,e,f}$ includes respective pneumatic supply ports $84_{a,b,c,d,e,f}$ (collectively, 84), respective pneumatic delivery ports $86_{a,b,c,d,e,f}$ (collectively, 86) and respective electronic control ports $90_{a,b,c,d,e,f}$ (collectively, 90). The electronic control ports 90 electronically communicate with the braking control apparatus 40 via the direct wired connection provided by the tractor wiring bundle (not shown) in the example, but it is to be appreciated that the electronic control ports 90 may be in electronic communication with the braking control apparatus 40 via the vehicle communication bus 80 or by another equivalent connection. Similarly, the trailer modulator valve 35 includes a pneumatic supply port 85, a pneumatic delivery port 87, and an electronic control port 91. The electronic control port 91 communicates electronically with the braking control apparatus 40 via the tractor wiring bundle (not shown) and/or the vehicle communication bus 80.

The supply ports 84 fluidly communicate with the respective delivery ports 86 based on the electronic modulator control signals at the respective control ports 90. For example, the unrestricted pneumatic pressure of the fluid at the supply ports 84 is fluidly communicated to the respective delivery ports 86 when the electronic modulator control signals are present at the respective control ports 90. Conversely, the supply ports 84 do not fluidly communicate with the respective delivery ports 86 when the electronic modulator control signals are not present at the respective control ports 90. Similarly and with regard to the trailer modulator valve 35, the supply port 85 fluidly communicates with the delivery port 87 based on the electronic modulator control signal at the control port 91. For example, the unrestricted pneumatic pressure of the fluid at the supply port 85 is fluidly communicated to the delivery port 87 when the electronic modulator control signal is at the control port 91. Conversely, the supply port 85 does not fluidly communicate with the delivery port 87 when the electronic modulator control signal is not present at the control port 91.

The modulator delivery ports $86_{a,b,c,d,e,f}$ fluidly communicate with the service brakes $14_{a,b,c,d,e,f}$ via respective service brake supply ports $92_{a,b,c,d,e,f}$. The service brakes $14_{a,b,c,d,e,f}$ are actuated based on the level of pneumatic pressure at respective service brake supply ports $92_{a,b,c,d,e,f}$.

The first relay valve 24 includes a pneumatic supply port 94, at least one pneumatic delivery port $96_{a,b,c,d}$ (collectively, delivery ports 96), a pneumatic control port 100 (e.g., a delivery control port) and an electronic control port 102 (e.g., a state control port). The supply port 94 fluidly communicates with the delivery port 56 of the first reservoir 16. The delivery ports $96_{a,b,c,d}$ fluidly communicate with the respective modulator supply ports $84_{a,b,c,d}$. The pneumatic control port 100 fluidly communicates with the delivery port 46 of the first shuttle valve 30. The electronic control port 102 electronically communicates with ECU 40 via the bus 80.

In general, the first relay valve 24 is responsive to a pressure control signal received at the pneumatic control port 100 resulting in a fluid connection between the supply port 94 and the delivery ports 96. In a further example embodiment, the first relay valve 24 may also be operable to be set to one of a plurality of states as may be necessary and/or desired based on an electronic control signal received from the ECU 40, via the bus 80, at the electronic control port 102 (e.g., state control port). In one embodiment, the first relay valve 24 is set to either a full system pressure (e.g., first) state or a proportional pressure (e.g., second) state. During the full system pressure (e.g., first) state, the supply port 94 fluidly communicates with the delivery port 96 unrestricted so that the full pressure at the supply port 94 is communicated to the delivery ports 96. During the proportional pressure (e.g., second) state (e.g., a reduced pressure state), the supply port 94 fluidly communicates with the delivery ports 96 based on the pressure at the pneumatic control port 100. For example, a higher pressure at the pneumatic control port 100 results in a higher pressure at the delivery ports 96. The first relay valve 24 is normally set to the proportional pressure (e.g., second) state and is only set to the full system pressure (e.g., first) state when the electronic control signal is actively being received at the electronic control port 102.

Similar to the first relay valve 24, the second relay valve 26 includes a pneumatic supply port 104, at least one pneumatic delivery port $106_{e,f}$ (collectively, delivery ports 106), a pneumatic control port 110 (e.g., a delivery control port) and an electronic control port 112 (e.g., a state control port). The supply port 104 fluidly communicates with the delivery port 60 of the second reservoir 20. The delivery ports 106 fluidly communicate with the respective modulator supply ports $84_{e,f}$. The pneumatic control port 110 fluidly communicates with the delivery port 54 of the second shuttle valve 32. The electronic control port 112 electronically communicates with ECU 40 via the bus 80.

In general, the second relay valve 26 is responsive to a pressure control signal received at the pneumatic control port 110 resulting in a fluid connection between the supply port 104 and the delivery ports 106. In a further example embodiment, the second relay valve 26 may also be operable to be set to one of a plurality of states as may be necessary and/or desired based on an electronic control signal received from the ECU 40, via the bus 80, at the electronic control port 112. In one embodiment, the second relay valve 26 is set to either a full system pressure (e.g., first) state or a proportional pressure (e.g., second) state (e.g., a reduced pressure state). During the full system pressure (e.g., first) state, the supply port 104 fluidly communicates with the delivery ports 106 unrestricted so that the full pressure at the supply port 104 is communicated to the delivery ports 106. During the proportional pressure (e.g., second) state, the supply port 104 fluidly communicates with the delivery ports 106 based on the pressure at the pneumatic control port 110. For example, a higher pressure at the pneumatic control port 110 results in a higher pressure at the delivery ports 106. Like the first relay valve 24, the second relay valve 26 is normally set to the proportional pressure (e.g., second) state and is only set to the full system pressure (e.g., first) state when the electronic control signal is actively being received at the electronic control port 112.

The brake system 10 is configured for connection with one or more braking devices (not shown) of one or more towed vehicle(s) or trailer(s), collectively trailer brake system (not shown) through a trailer control connection 37 and a trailer supply connection 39. The trailer supply connection 39 is pneumatically connected with the reservoirs 16, 20 of the associated towing vehicle 1 (tractor) through the trailer service valve 27 and one or more intervening devices including for example the operator controlled brake demand valve 36 (e.g., the foot brake valve). The trailer control connection 37 is pneumatically connected with the reservoirs 16, 20 of the associated towing vehicle 1 (tractor) through the trailer service valve 27 and the trailer modulator valve 35. The trailer modulator valve 35 is typically an electro-pneumatic valve, for example, a Bendix® M-32™ modulator. During periods of autonomous and/or operator-assisted operation of the vehicle relevant to the descriptions of the example embodiments herein, the trailer modulator valve 35 receives a brake control transmission signal from an output signal line of the braking control apparatus 40 and converts the brake control transmission signal to a control air signal for the one or more towed vehicle(s). Through the trailer modulator valve 35, the braking control apparatus 40 of the brake control system 38 of the brake system 10 is able to control the control air signal supplied to the trailer brake system (not shown). In particular, in an example embodiment, the braking control apparatus 40 of the brake control system 38 of the brake system 10 is configured to control the control air signal supplied to the trailer brake system through the trailer pressure modulator and trailer service valve devices 35, 27 for effecting brake control strategies in accordance with a trailer braking model that is selected and/or determined based on the configuration and characteristics of the one or more trailers from a database of stored braking models. In particular and in accordance with a further example embodiment, the braking control apparatus 40 of the brake control system 38 of the brake system 10 is configured to control the control air signal supplied to the trailer brake system through the trailer pressure modulator and trailer service valve devices 35, 27 for effecting brake control strategies in accordance with a stored trailer braking model that is modified based on the configuration and characteristics of the one or more trailers coupled with the tractor air brake system 10.

The trailer service valve 27 includes a pneumatic supply port 122, a first pneumatic delivery port 123a coupled with the trailer control connection 37, a second pneumatic delivery port 123*b* coupled with the trailer supply connection 39, (collectively, delivery ports 123), a pneumatic control port 124 (e.g., a delivery control port), a first parking brake pneumatic control port 125, and a second parking brake pneumatic control port 126. The pneumatic supply port 122 fluidly communicates with a delivery port 107 of the second relay valve 26 via the trailer modulator valve 35. The pneumatic control port 124 fluidly communicates with the third delivery port 77 of the foot brake valve 36.

In accordance with example embodiments, the braking control apparatus 40 receives deceleration command signals from the tractor ECU via the vehicle communication bus 80 during autonomous operation of the associated towing vehicle 1, during driver-assist operation of the associated towing vehicle 1, or the like. Under these conditions of autonomous and/or operator-assisted driving, the delivery port 107 of the second relay valve 26 is directly pneumatically coupled with the supply port 104 which is in turn coupled with the second reservoir 20. In addition and under these conditions of autonomous or operator assisted driving, the delivery port 123*a* of the trailer service valve is directly pneumatically coupled with the supply port 122 thereof, which is in turn coupled with the delivery port 87 of the trailer modulator valve 35. In that way, control over the delivery of braking air pressure to the one or more towed vehicles 3, 5, 7 is based on the signal delivered to the electric control port 91 of the trailer modulator valve 35 in accordance with a signal generated or otherwise developed by the braking control apparatus 40 and delivered to the electric control port 91 via the tractor wiring harness, wiring bundles, or the like. As described above, the supply port 85 of the trailer modulator valve 35 fluidly communicates with the delivery port 87 based on the electronic modulator control signal at the control port 91. For example, the unrestricted pneumatic pressure of the fluid at the supply port 85 is fluidly communicated to the delivery port 87 when the electronic modulator control signal is at the control port 91. Conversely, the supply port 85 does not fluidly communicate with the delivery port 87 when the electronic modulator control signal is not present at the control port 91. In accordance with the example embodiments and as will be described in greater detail herein, control logic is stored in a non-transient memory device of the braking control apparatus 40. The control logic is executable by the processor to determine an application trailer braking model different than a default trailer braking model based on information received from the one or more towed vehicles 3, 5, 7, and to determine compensated trailer braking control data by applying primal trailer braking control data representative of a primal trailer braking control signal to the determined application trailer braking model. The primal trailer braking control data may be received by the braking control apparatus 40 from the tractor ECU (not shown) of the associated towing vehicle 1 via the vehicle communication bus 80, for example. In another embodiment, the primal trailer braking control signal may be determined by the processor of the braking control apparatus 40 independently. An output circuit of the braking control apparatus 40 is operatively coupled with the processor and is responsive to the compensated trailer braking control data to generate a compensated trailer braking control signal 252 for delivery to a modulator valve 35 of the brake control system 38 of the brake system 10 of the associated towing vehicle 1. The modulator valve 35 of the brake control system 38 is responsive to the compensated trailer braking control signal 252 to activate brakes on the towed vehicle 3, 5, 7 based on the compensated trailer braking control signal 252. In that way, a braking control apparatus 40 and method are provided for determining trailer brake pressure models based on trailer information.

As mentioned above, the trailer modulator valve 35 includes a pneumatic supply port 85, a pneumatic delivery port 87, and an electronic control port 91. The electronic control port 91 communicates electronically with the braking control apparatus 40 via the tractor wiring harness, wiring bundles, or the like. In addition and with regard to the trailer modulator valve 35, the supply port 85 fluidly communicates with the delivery port 87 based on the electronic modulator control signal at the control port 91. For example, the unrestricted pneumatic pressure of the fluid at the supply port 85 is fluidly communicated to the delivery port 87 when the electronic modulator control signal is at the control port 91. Conversely, the supply port 85 does not fluidly communicate with the delivery port 87 when the electronic modulator control signal is not present at the control port 91. The communication between the supply port 85 and the delivery port 87 may be modulated as necessary and/or desired by controlling a modulation of the signal on the electronic control port 91 by the braking control apparatus 40. The control may be to adjust a timing of the modulated signal, a duration of the modulated signal, or a combination of a timing and a duration of the modulated signal.

With regard again to braking operation of the towing vehicle, during a normal service braking application, the braking control apparatus 40 is not transmitting a control signal to the control valve 22. Therefore, the control valve 22 is in the closed (e.g., first) state. As discussed above, no pneumatic fluid is transmitted to the control valve delivery port 64 during the first state and, consequently, no pneumatic pressure is present at the control valve delivery port 64.

During the normal service braking application, it is assumed the braking control apparatus 40 has previously transmitted respective control signals, via the tractor wiring harness, wiring bundles, or the like, to the first relay electronic control port 102 and the second relay electronic control port 112 to set both of the relay valves 24, 26 to the proportional pressure (e.g., second) state. It is further assumed that the braking control apparatus 40 has previously transmitted a control signal, via the tractor wiring harness, wiring bundles, or the like, to the relay electronic control port 125 to set the trailer service valve 27 to the proportional pressure (e.g., second) state. Therefore, when an operator of the associated vehicle towing 1 (tractor) depresses the foot brake valve 36, pneumatic pressure is delivered from the first delivery port 74 of the operator controlled brake demand valve 36 to the second supply port 44 of the first shuttle valve 30 based on how far a pedal 114 of the operator controlled brake demand valve 36 is depressed. Similarly, when the operator of the associated towing vehicle 1 depresses the pedal 114 of the foot brake valve 36, pneumatic pressure is delivered from the second delivery port 76 of the operator controlled brake demand valve 36 to the second supply port 52 of the second shuttle valve 32 based on how far the pedal 114 of the operator controlled brake demand valve 36 is depressed. Also similarly, when the operator of the associated towing vehicle 1 depresses the pedal 114 of the foot brake valve 36, pneumatic pressure is delivered from the delivery port 77 of the operator controlled brake demand valve 36 to the pneumatic control port 124 based on how far the pedal 114 of the operator controlled brake demand valve 36 is depressed. It is assumed substantially the same amount of pneumatic pressure is delivered from the first, second, and third foot valve delivery ports 74, 76, 77 when the pedal 114 is depressed a particular distance.

Since the control valve 22 is set to the closed (e.g., first) state during normal service braking, the pneumatic pressure at both of the first supply ports 42, 50 of the first and second shuttle valves 30, 32, respectively, is about zero (0) psi. Therefore, during normal service braking, the higher pressure at both of the first and second shuttle valves 30, 32, respectively, will be at the second supply ports 44, 52 based on the operator demanded braking indicated by how far the pedal 114 is depressed.

Since the relay and trailer service valves 24, 26, 27 default to the proportional pressure (e.g., second) state, the pneumatic pressure delivered to the delivery ports 96, 106, 123 is proportional to the braking pressure demanded by the operator, which is indicated by how far the pedal 114 is depressed (e.g., between 0 psi and full system pressure, for example between about 110 psi and about 130 psi).

During a typical (e.g., conventional) automated, autonomous and/or operator-assisted braking event, the control valve 22 is in the closed (e.g., first) state. However, the braking control apparatus 40 transmits control signals, via the tractor wiring harness, wiring bundles, or the like, to both the first relay valve electronic control port 102 and the second relay valve electronic control port 112 to set the first and second relay valves 24, 26, respectively, to full system pressure state. The also transmits a control signal, via the tractor wiring harness, wiring bundles, or the like, to the control port 91 of the modulator 35 to effectively set the trailer service valve 27 to full system pressure state. Then, while the first and second relay valves 24, 26 are in the full system pressure state, the braking control apparatus 40 transmits control signals, via the tractor wiring harness, wiring bundles, or the like, to at least one of the modulator control ports 90 according to a first (e.g., typical or conventional automated braking profile) for modulating the full system pressure delivered from the modulator supply port 84 to the modulator delivery port 86 of the at least one modulator 34. In addition and in accordance with an example embodiment, while the trailer service valve 27 is in the full system pressure state, the braking control apparatus 40 transmits a control signal, via the tractor wiring harness, wiring bundles, or the like, to the modulator control port 91 according to a first (e.g., typical or conventional automated braking profile) for modulating the full system pressure delivered from the modulator supply port 85 to the modulator delivery port 87 of the modulator 35.

During a reduced pressure automated, autonomous and/or operator-assisted braking event (e.g., an automated comfort-braking event), the control valve 22 is in the open (e.g., second) state. However, like the normal service braking application, it is assumed the braking control apparatus 40 has previously transmitted respective control signals to the first relay electronic control port 102 and the second relay electronic control port 112 to set both of the relay valves 24, 26 to the proportional pressure (e.g., second) state. Since the reduced pressure is delivered by the delivery port 64 to the first supply ports 42, 50 of the first and second shuttle valves 30, 32, the reduced pressure is present at the delivery ports 46, 54 of the first and second shuttle valves 30, 32—assuming the operator of the associated towing vehicle 1 does not depress the pedal 114 to demand braking pressure in excess of the reduced pressure. With the reduced pressure delivered to at least one of the modulator supply ports 84, the braking control apparatus 40 transmits control signals, via the tractor wiring harness, wiring bundles, or the like, to at least one of the modulator control ports 90 according to a second (e.g., reduced pressure braking profile) for modulating the full system pressure delivered from the modulator supply port 84 to the modulator delivery port 86 of the at least one modulator 34.

As described above with reference to the typical automated braking event and the reduced pressure automated braking event (e.g., an automated deceleration event, an automated comfort-braking event, etc.), the different braking profiles are previously stored in the memory device of the braking control apparatus 40. While the typical automated braking profile is designed for modulating full system pressure at the modulator supply ports 84, 87, the reduced pressure braking profile is designed for modulating reduced pressure (e.g., ≤about 80 psi, and in one particular example ≤about 55 psi) at the modulator supply ports 84, 87.

Figure 2:
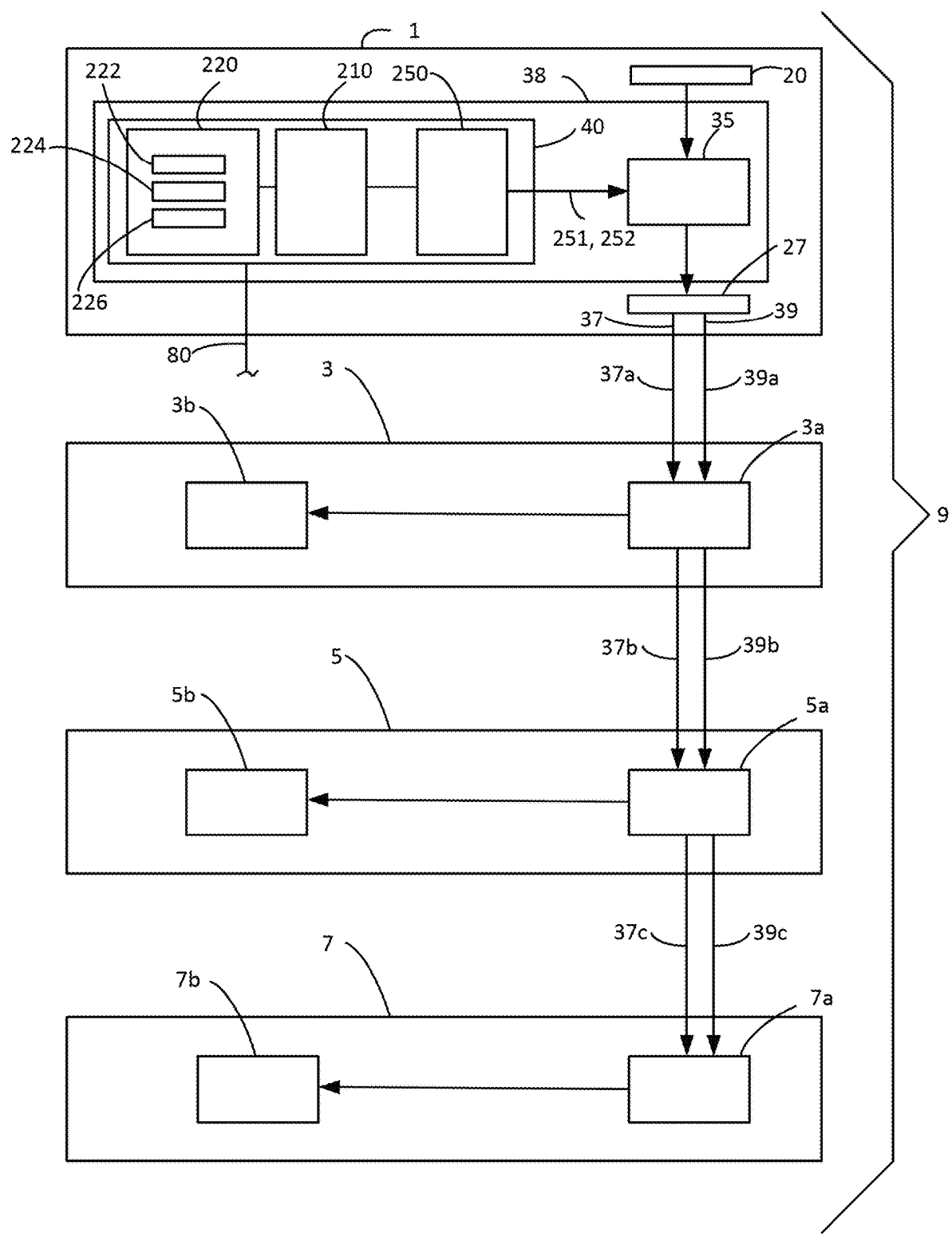
FIG. 2 is a schematic block diagram depiction that illustrates a braking control apparatus of an example embodiment disclosure disposed in an associated towing vehicle towing a set of towed vehicles as a combination vehicle.
Figure 4A:
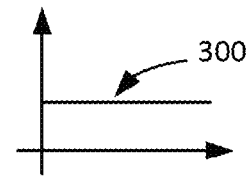
FIGS. 4A-4E are timing diagrams showing relative timing and signal intensities of electrical command signals delivered to a trailer modulator valve from the braking control apparatus and resulting pneumatic control signals at trailer brake valve mechanisms of multiple trailers in accordance with an example embodiment using a determined application trailer braking model.

FIG. 2 is a schematic block diagram depiction that illustrates the braking control apparatus 40 of an example embodiment of the subject disclosure disposed in an associated combination vehicle 9 that includes an associated towing vehicle 1 towing a set of towed vehicles 3, 5, 7 as the combination vehicle 9. As shown, in the example embodiment and in accordance with a first aspect, a brake control system 38 of an associated towing vehicle 1 towing one or more towed vehicles 3, 5, 7 as a combination vehicle 9 comprises a braking control apparatus 40 and a modulator valve 35 that is responsive to a compensated trailer braking control signal 252 developed by the braking control apparatus 40 in accordance with an application trailer braking model. Also as shown in the example embodiment, the braking control apparatus 40 is operable in a brake control system 38 of a brake system 10 (FIG. 1) of the associated towing vehicle 1, wherein the brake control system 38 of the brake system 10 includes the braking control apparatus 40 and the modulator valve 35. As described in connection with FIG. 1, the modulator valve 35 is disposed in fluid communication between the reservoir 20 and the trailer service valve 27 for selective delivery of pressurized air to the control and supply lines 37, 39. In that way the braking control apparatus 40 controls the modulator valve 35 to selectively supply braking air pressure to the set of towed vehicles 3, 5, 7. The pressurized air supplied to the set of towed vehicles 3, 5, 7 by the control and supply lines 37, 39 is received at trailer brake valve mechanisms 3a, 5a, 7a of the respective towed vehicles 3, 5, 7 for activation of brakes 3b, 5b, 7b disposed locally at the towed vehicles 3, 5, 7.

The braking control apparatus 40 of the example includes a processor 210, a non-transient memory device 220 operatively coupled with the processor 210, and an output circuit 250 operatively coupled with the processor 210. The non-transient memory device 220 of the example embodiment stores control logic 222, default trailer model data 224 representative of a default trailer braking model used by the braking control apparatus 40 to generate a default trailer braking control signal used to activate brakes on a default towed vehicle, and a default equipment parameter value 226 representative of an equipment parameter of a default set of one or more towed vehicles 3, 5, 7.

For connection to the trailer brakes 3b of the first towed vehicle 3, a pair of fluid hoses 37a, 39a extend between the trailer service valve 27 and the trailer brake valve mechanism 3a of the towed vehicle 3. The air hoses 37a, 39a are each provided with suitable quick connect couplings such as gladhand connectors or gladhand couplers or the like that provide fluid connections as well as sound mechanic interlocking of the hose coupling, whereby the tractor and trailer braking systems may be easily mutually pneumo-mechanically coupled and uncoupled relative to each other as necessary or desired. Similarly, for connection to the trailer brakes 5b of the second towed vehicle 5, a pair of fluid hoses 37b, 39b extend between the trailer brake valve mechanism 3a of the towed vehicle 3 and the trailer brake valve mechanism 5a of the towed vehicle 5. The air hoses 37b, 39b are each provided with suitable quick connect couplings such as gladhand connectors or gladhand couplers or the like that provide fluid connections as well as sound mechanic interlocking of the hose coupling, whereby the tractor and trailer braking systems may be easily mutually pneumo-mechanically coupled and uncoupled relative to each other as necessary or desired. Also similarly and for connection to the trailer brakes 7b of the third towed vehicle 7, a pair of fluid hoses 37c, 39c extend between the trailer brake valve mechanism 5a of the towed vehicle 5 and the trailer brake valve mechanism 7a of the towed vehicle 7. The air hoses 37c, 39c are each provided with suitable quick connect couplings such as gladhand connectors or gladhand couplers or the like that provide fluid connections as well as sound mechanic interlocking of the hose coupling, whereby the tractor and trailer braking systems may be easily mutually pneumo-mechanically coupled and uncoupled relative to each other as necessary or desired.

In accordance with example embodiments, the braking control apparatus 40 receives deceleration command signals from an ECU (not shown) of the tractor 1 via the vehicle communication bus 80 during autonomous operation of the associated towing vehicle 1, during driver-assist operation of the associated towing vehicle 1, or the like. The trailer modulator valve 35 and service valve 27 devices disposed in the tractor 1 are responsive to the received one or more electrical brake command signals to adjust the level of air pressure delivered to the trailer brake valve mechanisms 3a, 5a, 7a for suitably activating the trailer brake mechanisms 3b, 5b, 7b. In that sense, the trailer pressure modulator 35 and service valve 27 devices act as signal conversion mechanisms for converting the one or more electrical brake command signals 251 into an air pressure control signal suitable for use by the brake relay valves 3a, 5a, 7a disposed in the trailers 3, 5, 7.

The braking control apparatus 40 of the example embodiment uses a generic trailer braking model to compensate for the various timing delays, losses, and other non-linearities that inherently arise in systems having generic one or more trailers such as described above. As mentioned, the generic or default trailer braking model maps an electronic primal braking control signal developed within the ECU of the tractor during autonomous operation of the associated towing vehicle 1, during driver-assist operation of the associated towing vehicle 1, or the like to a compensated braking control signal for application of the compensated braking control signal to the trailer pressure modulator device so that the air pressure control signal actually realized at the control port of the trailer brake relay valve may better approximate the level and timing characteristics of the primal braking control signal. The non-transient memory device 220 of the example embodiment stores control logic 222, default trailer model data 224 representative of a default trailer braking model used by the braking control apparatus 40 to generate a default trailer braking control signal used to activate brakes on a default towed vehicle, and a default equipment parameter value 226 representative of an equipment parameter of a default set of one or more towed vehicles 3, 5, 7.

However, the equipment that couples the trailer pressure modulator valve devices with the control port of the trailer brake relay valve 27 may be different for different trailers. In addition, the overall configurations and characteristics of the trailers 3, 5, 7 may be different than the overall configurations and characteristics of generic of base-line trailers. Accordingly, the braking control apparatus 40 is operable to generate a compensated trailer braking control signal developed by the braking control apparatus in accordance with an application trailer braking model that is determined by the braking control apparatus based on trailer configuration data received by the braking control apparatus to activate brakes on the towed vehicle in response to the compensated trailer braking control signal received by the modulator valve. The application trailer configuration data is representative of an application value of an equipment parameter of the towed vehicle. Thereby, the operation of the modulator valve 35 and the brakes of the trailer are particularly tailored to one or more specific characteristics of the towed vehicle.

FIGS. 3A-3E are timing diagrams showing relative timing and signal intensities of the electrical command signals to the trailer modulator valve 35 from the braking control apparatus 40, and the resulting pneumatic control signals at the trailer brake valve mechanisms 3a, 5a, 7a of the trailers 3, 5, 7 in accordance with an example embodiment wherein a trailer brake pressure model is selected that is different than a generic or otherwise standard or standardized trailer braking model and, in accordance with a further example embodiment selects selecting a trailer brake pressure model that is different than a generic or otherwise standard or standardized trailer braking model based on trailer information.

In accordance with example embodiments, the braking control apparatus 40 receives a deceleration command signal 300 from the tractor ECU via the vehicle communication bus 80 during autonomous operation of the associated towing vehicle 1, during driver-assist operation of the associated towing vehicle 1, or the like. The deceleration command signal 300 may be received in the form of a digital or analog signal and may comprise primal trailer braking control data representative of a primal trailer braking control signal to be applied to the default trailer braking model when application trailer configuration data representative of an application value of an equipment parameter of the towed vehicle 3, 5, 7 is not received by the braking control apparatus 40. That is, the braking control apparatus 40 may use the default trailer braking model when the towed vehicles 3, 5, 7 are unable or otherwise prevented from delivering application trailer configuration data representative of the application value of the equipment parameter of the towed vehicles 3, 5, 7.

Figure 3A:
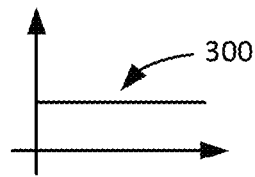
FIGS. 3A-3E are timing diagrams showing relative timing and signal intensities of electrical command signals delivered to a trailer modulator valve from the braking control apparatus and resulting pneumatic control signals at trailer brake valve mechanisms of multiple trailers in accordance with an example embodiment using a default trailer braking model.
Figure 3B:
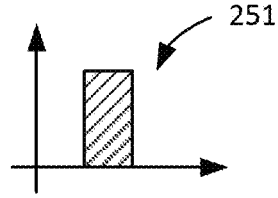

The output circuit 250 operatively coupled with the processor 210 is responsive to receiving the deceleration command signal 300 from the tractor ECU to generate a default trailer braking control signal 251 as shown in FIG. 3B for delivery to a modulator valve 35 of the brake control system 38 of the brake system 10 of the associated towing vehicle 1 that is responsive to the default trailer braking control signal 251 to activate brakes on the towed vehicle 3, 5, 7 based on the default trailer braking model.

Figure 3C:
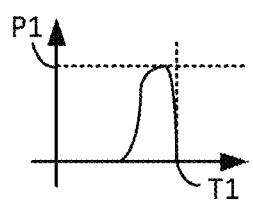
Figure 3D:
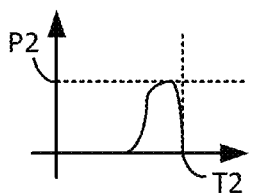
Figure 3E:
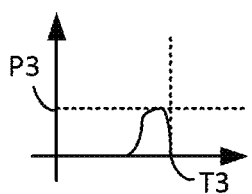

The resultant pressure at the trailer brake valve mechanism 3a of the respective towed vehicle 3 for activation of brakes 3b disposed locally at the towed vehicle 3 is shown in FIG. 3C having a peak pressure P1 and a duration of T1. Similarly, the resultant pressure at the trailer brake valve mechanism 5a of the respective towed vehicle 5 for activation of brakes 5b disposed locally at the towed vehicle 5 is shown in FIG. 3D having a peak pressure P2 and a duration of T2. Also similarly, the resultant pressure at the trailer brake valve mechanism 7a of the respective towed vehicle 7 for activation of brakes 7b disposed locally at the towed vehicle 7 is shown in FIG. 3E having a peak pressure P3 and a duration of T3.

In some cases the pressures P1, P2, and/or P3 may be unappropriated and/or inadequate for the particular parameters of the towed vehicles 3, 5, 7.

In practice, the pressure level of the air pressure control signal to the brake relay valve at the end of a long, e.g. 53' trailer may be substantially less than is needed to deliver an adequate air pressure control signal. The original level of the signal may be substantially degraded at the end of a long trailer owing to the simple physics of communicating pneumatic signals in hoses. This signal level discrepancy is even more pronounced for tractors that tow multiple trailers in the combination vehicle. This signal level discrepancy is shown in FIG. 3C, 3D, 3E by the sequentially decreased levels of the pressures P1, P2, and P3.

While the default trailer braking model provides some benefit over the use of the electronic primal braking control signal converted to a pneumatic signal directly, this solution lacks the ability to address the condition that any given tractor may tow one or more towed vehicles that have vastly different physical sizes and/or constructions. The generic trailer braking model is, essentially, a compromise.

Given the above, therefore, the example embodiments herein provide a system and method for determining a trailer brake pressure model based on trailer information, a system and method for selecting a trailer brake pressure model based on trailer information, an adaptive control of a brake pressure modulator by determining a brake pressure model based on trailer information, adaptive control of a brake pressure modulator by selecting a brake pressure model based on trailer information, and control of a trailer brake pressure modulator using an adaptive brake pressure model based on trailer information.

Figure 4B:
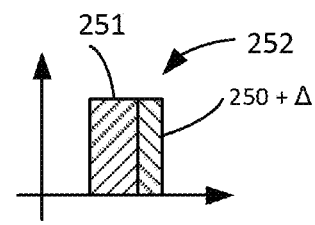

FIG. 4B shows a compensated trailer braking control signal 252 for delivery to a modulator valve 35 of the brake control system 38 of the brake system 10 of the associated towing vehicle 1. The modulator valve 35 of the brake control system 38 is responsive to the compensated trailer braking control signal 252 to activate brakes on the towed vehicle 3, 5, 7 based on the compensated trailer braking control signal 252. In that way, a braking control apparatus 40 and method are provided for determining trailer brake pressure models based on trailer information. As can be seen, the default trailer braking control signal 251 is augmented by an amount 250+Δ to activate brakes on the towed vehicle 3, 5, 7 based on application trailer braking model different than the default trailer braking model. In the example embodiments, the control logic 222 stored in the non-transient memory device 220 is executable by the processor 210 to determine an application trailer braking model different than the default trailer braking model based on i) application trailer configuration data received by the braking control apparatus 40, wherein the application trailer configuration data is representative of an application value of an equipment parameter of the towed vehicle 3, 5, 7, or ii) the default trailer braking model and the received application trailer configuration data.

Figure 4C:
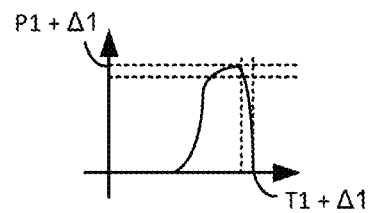
Figure 4D:
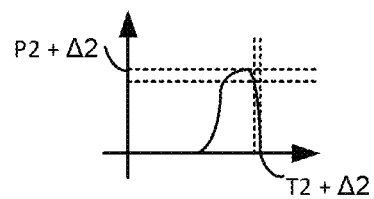
Figure 4E:
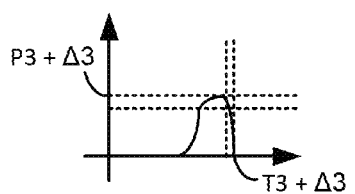

The resultant pressure at the trailer brake valve mechanism 3a of the respective towed vehicle 3 for activation of brakes 3b disposed locally at the towed vehicle 3 is shown in FIG. 4C having a peak pressure P1+Δ and a duration of T1+Δ. Similarly, the resultant pressure at the trailer brake valve mechanism 5a of the respective towed vehicle 5 for activation of brakes 5b disposed locally at the towed vehicle 5 is shown in FIG. 4D having a peak pressure P2+Δ and a duration of T2+Δ. Also similarly, the resultant pressure at the trailer brake valve mechanism 7a of the respective towed vehicle 7 for activation of brakes 7b disposed locally at the towed vehicle 7 is shown in FIG. 4E having a peak pressure P3+Δ and a duration of T3+Δ.

Figure 5:
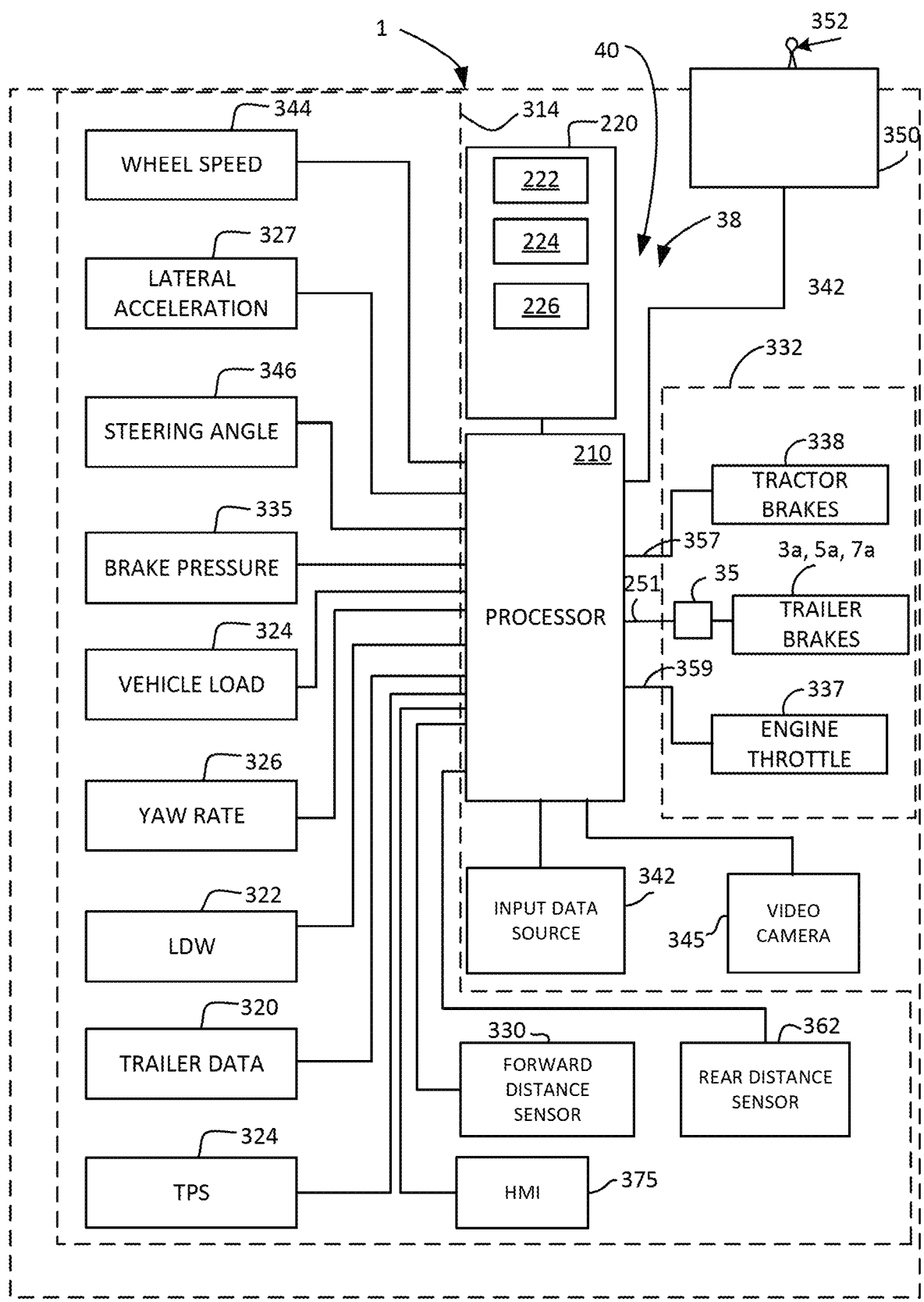
FIG. 5 is a schematic block diagram depiction that illustrates details of the towing vehicle controller of FIG. 1 in accordance with an example embodiment.

FIG. 5 is a schematic block diagram depiction that illustrates details of the towing vehicle braking control apparatus 40 of FIG. 1 disposed in a vehicle 1 in accordance with an example embodiment. According to principles of the example embodiment as illustrated, the braking control apparatus 40 may be adapted to detect, monitor, and report a variety of operational parameters and conditions of the commercial vehicle and the driver's interaction therewith, and to selectively determine a trailer braking profile based on application trailer configuration data relating to one or more towed vehicles 3, 5, 7 as may be needed or desired such as, for example, to maintain vehicle stability or to maintain the vehicle following distance relative to other vehicles within a platoon.

According to principles of the example embodiment as illustrated, the braking control apparatus 40 may be adapted to determine the trailer braking profile based on application trailer configuration data received by the braking control apparatus 40 from one or more towed vehicles 3, 5, 7.

According to further principles of the example embodiment as illustrated, the braking control apparatus 40 may be adapted to determine the trailer braking profile based on application trailer configuration data received by the braking control apparatus 40 from an associated user of the tractor via a human interface device 375 operatively coupled with the braking control apparatus 40.

According to still further principles of the example embodiment as illustrated, the braking control apparatus 40 may be adapted to determine the trailer braking profile by selecting a stored profile from among a set of stored profiles, wherein the selection is based on application trailer configuration data received by the braking control apparatus 40.

According to yet still further principles of the example embodiment as illustrated, the braking control apparatus 40 may be adapted to determine the trailer braking profile by modifying a stored profile using application trailer configuration data received by the brake controller within the braking control apparatus 40, wherein the application trailer configuration data is applied directly and/or indirectly to the stored trailer braking profile.

In the exemplary embodiment of FIG. 5, the braking control apparatus 40 may include one or more devices or systems 314 for providing input data indicative of one or more operating parameters or one or more conditions of a commercial vehicle. For example, the devices 314 may be one or more sensors, such as but not limited to, one or more wheel speed sensors 344, a lateral acceleration sensor 327, a steering angle sensor 346, a brake pressure sensor 335, a vehicle load sensor 324, a yaw rate sensor 326, a lane departure warning (LDW) sensor or system 322, and a tire pressure (TPMS) monitoring system 324. The braking control apparatus 40 may also utilize additional devices or sensors in the exemplary embodiment including for example a forward distance sensor 330, and a rear distance sensor 362. Other sensors and/or actuators or energy generation devices or combinations thereof may be used of otherwise provided as well, and one or more devices or sensors may be combined into a single unit as may be necessary and/or desired.

The vehicle braking control apparatus 40 may also include a logic applying arrangement such as a controller or processor 210 and control logic 222, in communication with the one or more devices or systems 314. The processor 210 may include one or more inputs for receiving input data from the devices or systems 314. The processor 210 may be adapted to process the input data and compare the raw or processed input data to a stored threshold value. The processor 210 may also include one or more outputs for delivering control signals 357, 358, 359 to one or more vehicle systems 332 based on the comparison. The control signals 357, 359, 251 may instruct the systems 332 to intervene in the operation of the vehicle to initiate corrective action, and then report this corrective action to a wireless service (not shown) or simply store the data locally to be used for determining a driver quality. For example, the processor 210 may generate and send the control signal 359 to an engine electronic control unit or an actuating device to reduce the engine throttle 337 and slowing the vehicle down. Further, the processor 210 may send the control signal 251 to a vehicle brake system to selectively engage the brakes. In the tractor-trailer arrangement of the example embodiment, the processor 210 may engage the brakes on one or more wheels of a trailer portion of the vehicle 9 via the trailer pressure control devices shown in FIG. 1, and the brakes on one or more wheels of a tractor portion of the vehicle, and then report this corrective action to the wireless service or simply store the data locally to be used for determining a driver quality. A variety of corrective actions may be possible and multiple corrective actions may be initiated at the same time.

The processor 210 may also include a memory portion 220 for storing and accessing system information, such as for example control logic 222, default trailer model data 224 representative of a default trailer braking model used by the braking control apparatus 40 to generate a default trailer braking control signal used to activate brakes on a default towed vehicle, and a default equipment parameter value 226 representative of an equipment parameter of a default set of one or more towed vehicles 3, 5, 7. The memory portion 220, however, may be separate from the processor 210. The sensors 314 and processor 210 may be part of a preexisting system or use components of a preexisting system. For example, the Bendix® ABS-6™ Advanced Antilock Brake Controller with ESPR Stability System available from Bendix Commercial Vehicle Systems LLC may be installed on the vehicle. The Bendix® ESP® system may utilize some or all of the sensors described in FIG. 3. The logic component of the Bendix® ESP® system resides on the vehicle's antilock brake system electronic control unit, which may be used for the processor 210 of the example embodiment. Therefore, many of the components to support the vehicle braking control apparatus 40 of the present invention may be present in a vehicle equipped with the Bendix® ESPR system, thus, not requiring the installation of additional components. The vehicle braking control apparatus 40, however, may utilize independently installed components if desired.

The braking control apparatus 40 may also include a source of input data 342 indicative of a configuration/condition of a commercial vehicle. The processor 210 may sense or estimate the configuration/condition of the vehicle based on the input data, and may select a control tuning mode or sensitivity based on the vehicle configuration/condition. The processor 210 may compare the operational data received from the sensors or systems 314 to the information provided by the tuning. The tuning of the system may include, but not be limited to: the nominal center of gravity height of the vehicle, look-up maps for lateral acceleration level for rollover intervention, look-up maps for yaw rate differential from expected yaw rate for yaw control interventions, steering wheel angle allowance, tire variation allowance, and brake pressure rates, magnitudes and maximums to be applied during corrective action.

A vehicle configuration/condition may refer to a set of characteristics of the vehicle which may influence the vehicle's stability (roll and/or yaw). For example, in a vehicle with a towed portion, the source of input data 342 may communicate the type of towed portion. In tractor-trailer arrangements, the type of trailer being towed by the tractor may influence the vehicle stability and braking ability and characteristics. This is evident, for example, when multiple trailer combinations (doubles and triples) are towed. Vehicles with multiple trailer combinations may exhibit an exaggerated response of the rearward units when maneuvering (i.e. rearward amplification). To compensate for rearward amplification, the braking control apparatus 40 may select a trailer braking tuning that makes the system more sensitive (i.e. intervene earlier than would occur for a single trailer condition). The control trailer braking tuning may be, for example, specifically defined to optimize the performance of the data collection and communication module for a particular type of trailer being hauled by a particular type of tractor. Thus, the braking control tuning may be different for the same tractor hauling a single trailer, a double trailer combination, or a triple trailer combination.

The type of load the commercial vehicle is carrying and the location of the center of gravity of the load may also influence vehicle stability. For example, moving loads such as liquid tankers with partially filled compartments and livestock may potentially affect the turning and rollover performance of the vehicle. Thus, a more sensitive braking control tuning mode may be selected to account for a moving load. Furthermore, a separate control tuning mode may be selectable when the vehicle is transferring a load whose center of gravity is particularly low or particularly high, such as for example with certain types of big machinery or low flat steel bars.

In addition, the processor 210 is operatively coupled with one or more video image capture devices shown in the example embodiment for simplicity and ease of illustration as a single video camera 345 representation of one or more physical video cameras disposed on the vehicle such as, for example, one video camera on each corner of the vehicle or one or more cameras mounted remotely and in operative communication with the controller 40.

Still yet further, the braking control apparatus 40 may also include a transmitter/receiver (transceiver) module 350 such as, for example, a radio frequency (RF) transmitter including one or more antennas 352 for wireless communication of the automated deceleration requests, GPS data, one or more various vehicle configuration and/or condition data, or the like between the vehicles and one or more destinations such as, for example, to one or more wireless services (not shown) having a corresponding receiver and antenna. The transmitter/receiver (transceiver) module 350 may include various functional parts of sub portions operatively coupled with the platoon control unit including for example a communication receiver portion, a global position sensor (GPS) receiver portion, and a communication transmitter. For communication of specific information and/or data, the communication receiver and transmitter portions may include one or more functional and/or operational communication interface portions as well.

The processor 210 is operative to communicate the acquired data to the one or more receivers in a raw data form, that is without processing the data, in a processed form such as in a compressed form, in an encrypted form or both as may be necessary or desired. In this regard, the processor 210 may combine selected ones of the vehicle parameter data values into processed data representative of higher level vehicle condition data such as, for example, data from the lateral acceleration sensor 327 may be combined with the data from the steering angle sensor 326 to determine excessive curve speed event data. Other hybrid event data relatable to the vehicle and driver of the vehicle and obtainable from combining one or more selected raw data items form the sensors includes, for example and without limitation, excessive braking event data, excessive curve speed event data, lane departure warning event data, excessive lane departure event data, lane change without turn signal event data, loss of video tracking event data, LDW system disabled event data, distance alert event data, forward collision warning event data, haptic warning event data, collision mitigation braking event data, ATC event data, ESC event data, RSC event data, ABS event data, TPMS event data, engine system event data, average following distance event data, average fuel consumption event data, and average ACC usage event data.

A basic platoon includes a host or leader vehicle in traffic with a second or follower vehicle in accordance with the present disclosure. Typically, the follower vehicle travels proximate to the leader vehicle seriatim in an ordered platoon along a roadway. The leader vehicle is provided with a braking control apparatus 40 which includes data collection and communication module logic and brake monitoring and platooning control logic. Similarly, the follower vehicle is also provided with an electronic control system which includes data collection and communication module logic and brake monitoring and platooning control logic. In the example embodiments to be described herein, each of the two or more vehicles comprising the various platoons that will be described include the same or equivalent electronic trailer braking control system 40, the same or equivalent data collection and communication module logic, and the same or equivalent brake monitoring and platooning control logic, although other control systems having the functionality to be described herein may equivalently be used as necessary or desired.

In the example embodiment illustrated, the braking control apparatus 40 of the respective vehicles of the platoon are configured for mutually communicating signals and exchanging data between each other and between their respective one or more towed vehicles, and also for communicating signals and exchanging data with various other communication systems including for example a remote wireless communication system and a remote satellite system. These remote systems can provide, for example, global position system (GPS) data to the vehicles as desired. Other information may be provided or exchanged between the vehicles and the remote systems as well such as, for example, fleet management and control data from a remote fleet management facility, or the like (not shown). Although this functionality is provided, the embodiments herein find this remote communication, though useful, not necessarily essential wherein the embodiments herein are directed to trailer braking strategies for platooning for inter-vehicle platoon distance and/or spacing management i.e. platoon ordering and spacing beneficially without the need to consult with or act under the direction of or in concert with the remote satellite system, the remote fleet management facility, a Network Operations Center (NOC), a Central Command Center (CCC), or the like.

In addition to the above, the towing vehicle braking control apparatus 40 of each platooning vehicle operates to perform various vehicle-to-(single)vehicle (V2V Unicast) communication (communication between a broadcasting vehicle and a single responding vehicle), as well as various vehicle-to-(multiple)vehicle (V2V Broadcast) communication (communication between a broadcasting vehicle and two or more responding vehicles), and further as well as various vehicle-to-infrastructure (V2I) communication.

Operationally, each communication-capable vehicle sends the needed information by a broadcast to every other communication-capable vehicle within range, and the receiving vehicle(s) decide if they want to process the received message. For example only vehicles who are platoon capable and the driver has indicated, via a switch or user interface, that joining a platoon is desired, that vehicle will start broadcasting and listening for the Platoon protocol messages. All other vehicles in the area will receive and ignore the platoon information. Accordingly, as will be used herein and for purposes of describing the example embodiments, "V2V Unicast" communication will refer to communication between a broadcasting vehicle and a single responding vehicle, and "V2V Broadcast communication" will refer to communication between a broadcasting vehicle and two or more responding vehicles.

The trailer braking control apparatus 40 of FIG. 5 is suitable for executing embodiments of one or more software systems or modules that perform trailer brake strategies and trailer braking control methods according to the subject application. The example braking control apparatus 40 may include a bus or other communication mechanism for communicating information, and a processor 210 coupled with the bus for processing information. The computer system includes a main memory 220, such as random access memory (RAM) or other dynamic storage device for storing information and instructions to be executed by the processor 230, and read only memory (ROM) or other static storage device for storing static information and instructions for the processor 210. Other storage devices may also suitably be provided for storing information and instructions as necessary or desired.

Logic instructions may be read into the main memory 220 from another computer-readable medium, such as another storage device of via the transceiver 350. Execution of the sequences of instructions contained in main memory 220 causes the processor 210 to perform the process steps described herein. In an alternative implementation, hard-wired circuitry may be used in place of or in combination with software instructions to implement the invention. Thus implementations of the example embodiments are not limited to any specific combination of hardware circuitry and software.

In accordance with the descriptions herein, the term "computer-readable medium" as used herein refers to any non-transitory media that participates in providing instructions to the processor 210 for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, or any other tangible non-transitory medium from which a computer can read.

In addition and further in accordance with the descriptions herein, the term "logic", as used herein with respect to the Figures, includes hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components.

In accordance with an example embodiment, the logic 222 is executed by the processor 210 to determine an application trailer braking model different than a default trailer braking model stored in the memory based on application trailer configuration data received by the brake controller, wherein the application trailer configuration data is representative of an application value of an equipment parameter of the towed vehicle, or the default trailer braking model and the application trailer configuration data. The logic 222 is executed by the processor 210 further to determine compensated trailer braking control data by applying primal trailer braking control data representative of a primal trailer braking control signal to the determined application trailer braking model. An output circuit operatively coupled with the processor is responsive to the compensated trailer braking control data to generate a compensated trailer braking control signal 252, the compensated trailer braking control signal 252 for activating brakes on the towed vehicle based on the compensated trailer braking control signal 252.

In accordance with an example embodiment, the logic 222 is executed by the processor 210 to determine the application trailer braking model based on the application trailer configuration data received by the brake controller by selecting the application trailer braking model from a plurality of application trailer braking models stored in the non-transient memory device based on the application trailer configuration data received by the brake controller.

In accordance with an example embodiment, the logic 222 is executed by the processor 210 to select the application trailer braking model from the plurality of application trailer braking models stored in the non-transient memory device based on determining that the application value of the equipment parameter of the towed vehicle represented by the application trailer configuration data is within a first predetermined range.

In accordance with an example embodiment, the logic 222 is executed by the processor 210 to determine the application trailer braking model based on the default trailer braking model and the application trailer configuration data by determining a difference between the default value of the equipment parameter and the application value of the equipment parameter, and modifying the default trailer braking model to generate the application trailer braking model by applying the difference to the default trailer braking model using a modification function.

In accordance with an example embodiment, the logic 222 is executed by the processor 210 to determine the application trailer braking model based on the default trailer braking model and the application trailer configuration data by modifying the default trailer braking model to generate the application trailer braking model by applying the application value of the equipment parameter to the default trailer braking model using a modification function.

In accordance with an example embodiment, the received trailer configuration signal is a manual trailer configuration signal provided by an associated operator of the associated towing vehicle via a controller manual input operatively coupled with the processor, wherein the manual trailer configuration signal comprises the application trailer configuration data representative of the application value of the equipment parameter of the towed vehicle.

In accordance with an example embodiment, the received trailer configuration signal is an automatic trailer configuration signal received from an associates source external to the associated combination vehicle and external to the braking control apparatus via a controller automatic input operatively coupled with the processor, wherein the automatic trailer configuration signal comprises the application trailer configuration data representative of the application value of the equipment parameter of the towed vehicle.

Figure 6A:
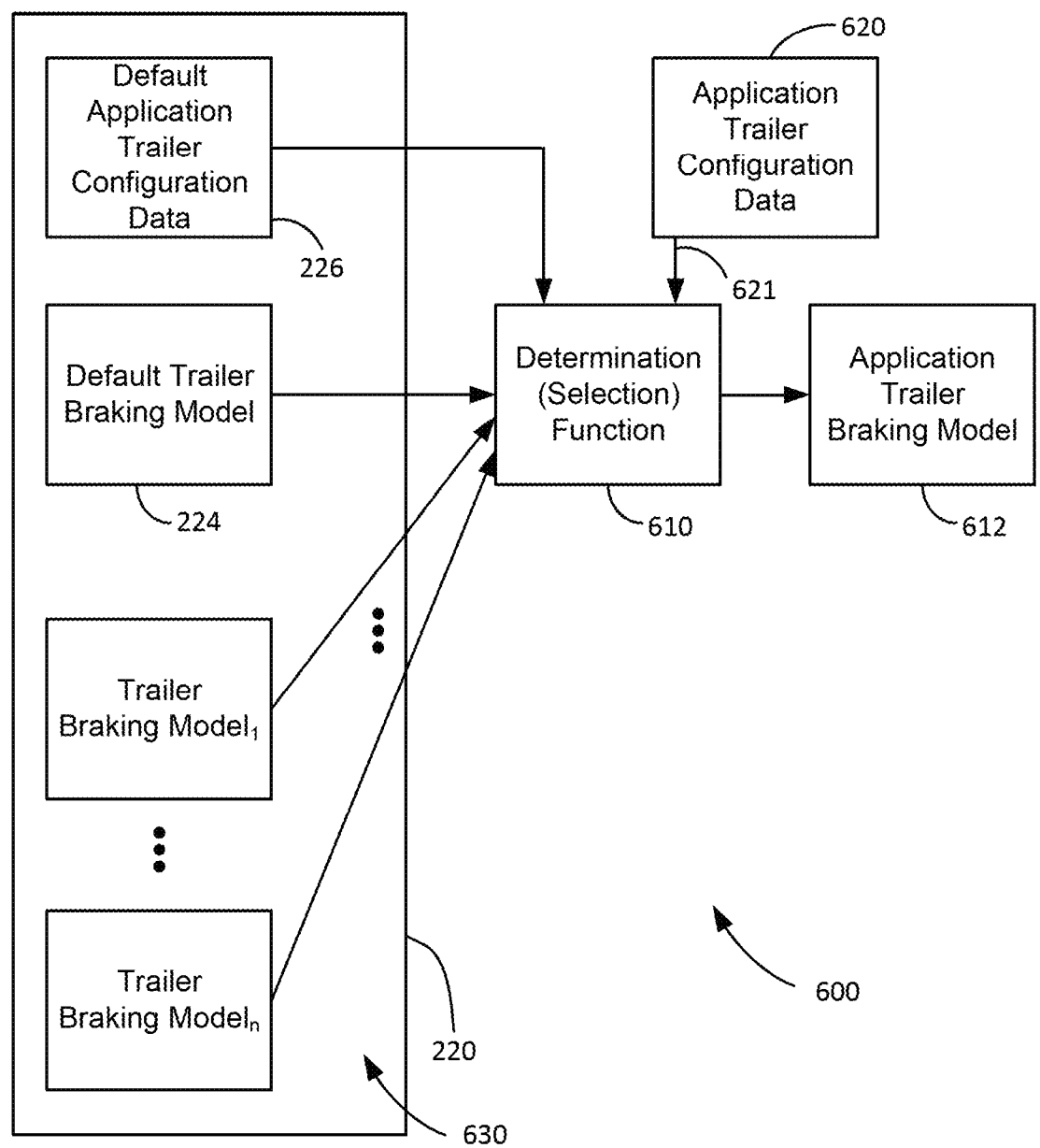
FIG. 6A is a functional block diagram showing a technique for selecting brake pressure model based on trailer information in accordance with an example embodiment.

FIG. 6A is a functional block diagram showing a technique 600 for selecting brake pressure model based on trailer information in accordance with an example embodiment. In an example embodiment, the towing vehicle controller ECU 40 of the brake system 10 is configured to control the control air signal supplied to the trailer brake system through the trailer pressure modulator and multi-pressure valve devices 35, 37 for effecting brake control strategies in accordance with a trailer braking model that is selected based on the configuration and characteristics of the one or more trailers from a database of stored braking models. In the example embodiment, the control logic is executable by the processor to determine 610 the application trailer braking model 612 based on the application trailer configuration data 620 received by the brake controller by selecting the application trailer braking model 612 from a plurality of application trailer braking models 630 stored in the non-transient memory device 220 based on the application trailer configuration data 620 received by the brake controller.

In accordance with an example embodiment, a received trailer configuration signal 621 is a manual trailer configuration signal provided by an associated operator of the associated towing vehicle via a controller manual input operatively coupled with the processor, wherein the manual trailer configuration signal comprises the application trailer configuration data 620 representative of the application value of the equipment parameter of the towed vehicle.

In accordance with an example embodiment, the received trailer configuration signal 621 is an automatic trailer configuration signal received from an associates source external to the associated combination vehicle and external to the braking control apparatus via a controller automatic input operatively coupled with the processor, wherein the automatic trailer configuration signal comprises the application trailer configuration data 620 representative of the application value of the equipment parameter of the towed vehicle.

Further in the example embodiment, the control logic of the braking control apparatus is executable by the processor to select the application trailer braking model 612 from the plurality of application trailer braking models 630 stored in the non-transient memory device 220 based on determining that the application value of the equipment parameter of the towed vehicle represented by the application trailer configuration data is within a first predetermined range.

Figure 6B:
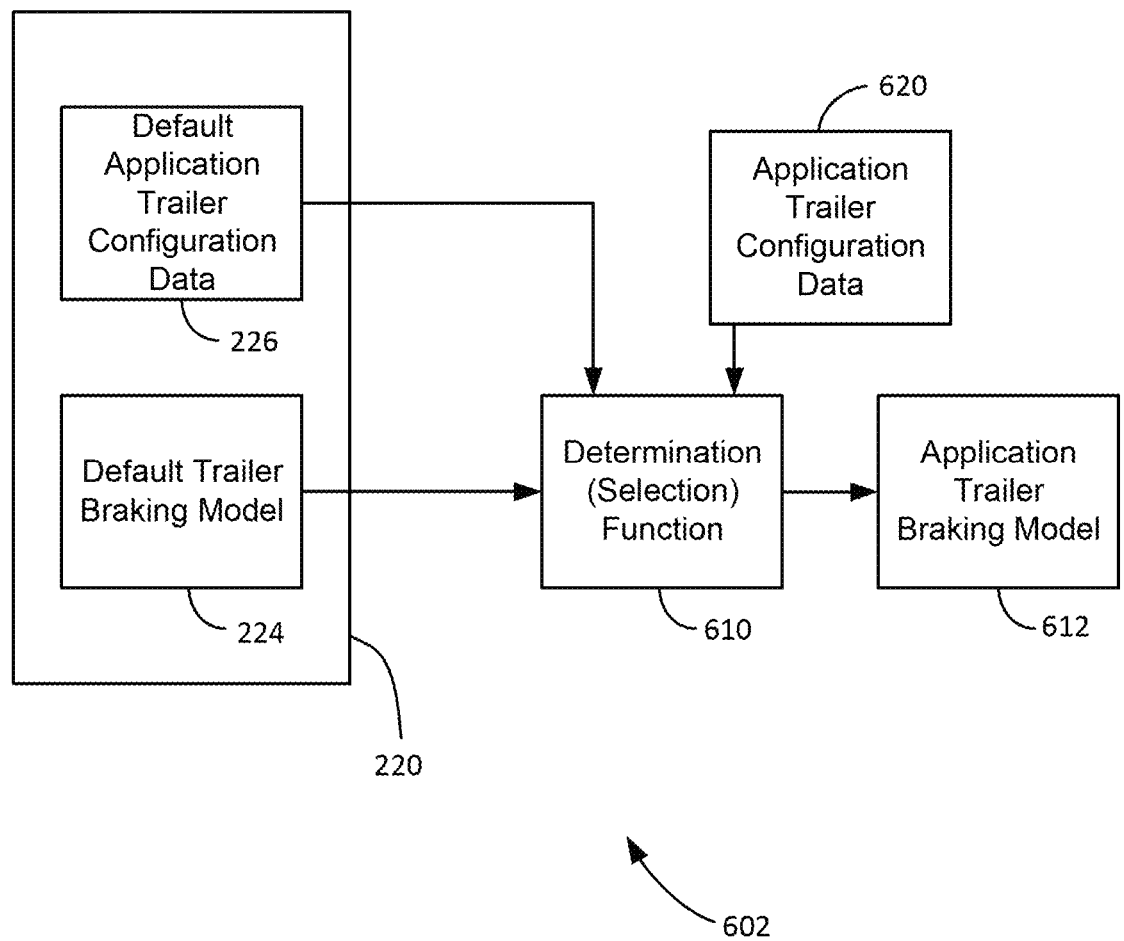
FIG. 6B is a functional block diagram showing a technique for selecting brake pressure model based on trailer information in accordance with an example embodiment.

FIG. 6B is a functional block diagram showing a further technique 602 for selecting brake pressure model based on trailer information in accordance with an example embodiment. In accordance with a further example embodiment, the braking control apparatus 40 of the brake control system 38 of the brake system 10 is configured to control the control air signal supplied to the trailer brake system through the trailer pressure modulator and multi-pressure valve devices 35, 37 for effecting brake control strategies in accordance with a stored trailer braking model 224 that is modified based on the configuration and characteristics of the one or more trailers coupled with the tractor air brake system 10. The non-transient memory device 220 stores a default value of the equipment parameter corresponding to the default trailer model data 601 representative of the default trailer braking model used by the braking control apparatus to generate the default trailer braking signal used to activate brakes on the default towed vehicle having the default value of the equipment parameter. The control logic is executable by the processor to determine the application trailer braking model 612 based on the default trailer braking model 224 and the application trailer configuration data 620 by determining a difference between the default value of the default equipment parameter 226 and the application value of the application equipment parameter 620, and modifying the default trailer braking model 224 to generate the application trailer braking model 612 by applying the difference to the default trailer braking model 224 using a modification function.

Figure 6C:
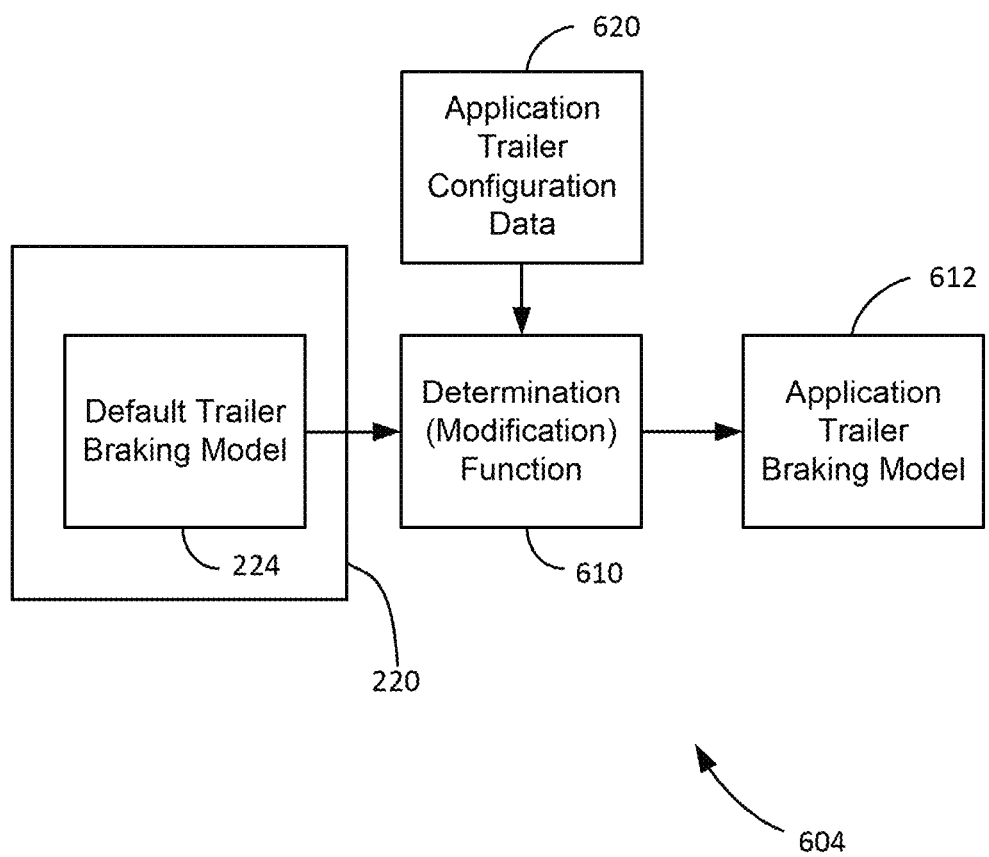
FIG. 6C is a functional block diagram showing a technique for selecting brake pressure model based on trailer information in accordance with an example embodiment.

FIG. 6C is a functional block diagram showing still a further technique 604 for selecting brake pressure model based on trailer information in accordance with an example embodiment. In accordance with a further example embodiment, the towing vehicle braking control apparatus 40 of the brake system 10 is configured to control the control air signal supplied to the trailer brake system through the trailer pressure modulator and multi-pressure valve devices 35, 37 for effecting brake control strategies in accordance with a stored trailer braking model that is modified based on the configuration and characteristics of the one or more trailers coupled with the tractor air brake system 10. In accordance with the embodiment, the control logic is executable by the processor to determine the application trailer braking model based on the default trailer braking model 224 and the application trailer configuration data 620 by modifying the default trailer braking model to generate the application trailer braking model 612 by applying the application value of the equipment parameter to the default trailer braking model using a modification function.

Figure 7A:
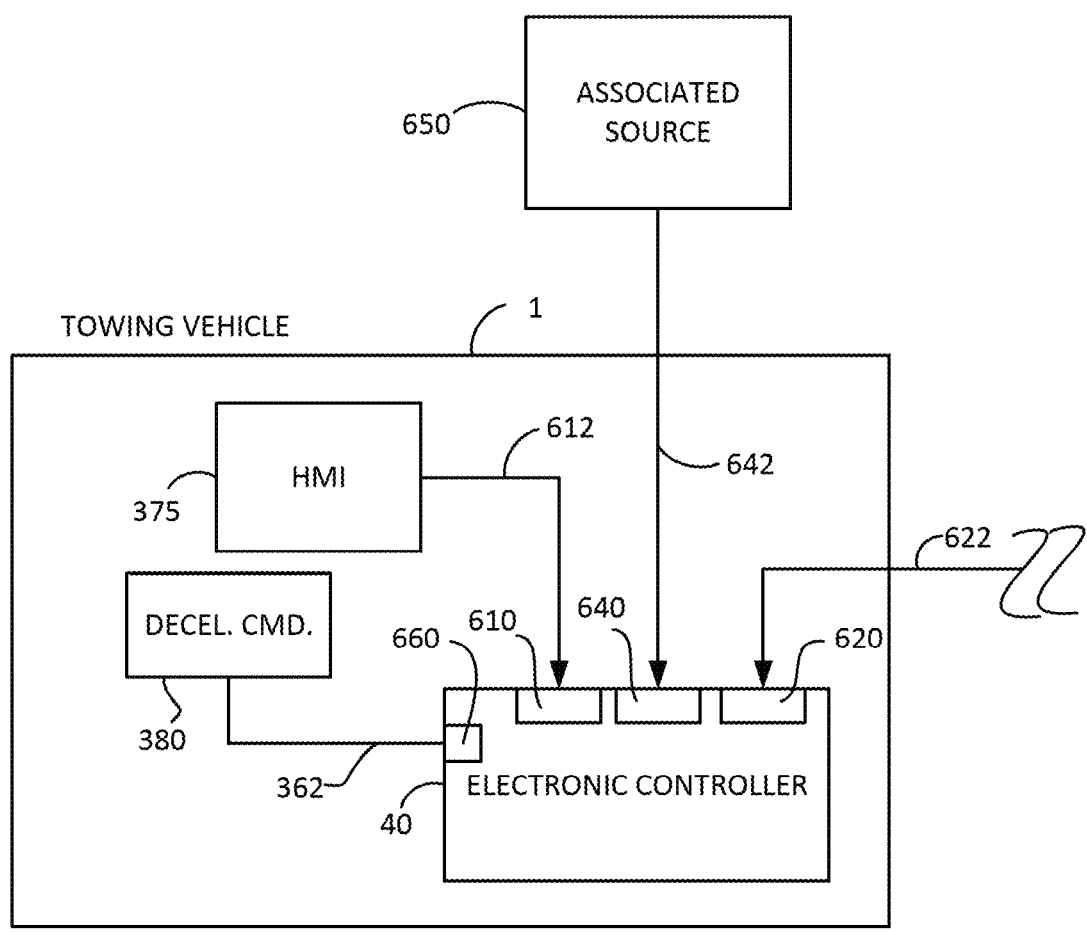
FIG. 7A is a functional block diagram illustrating the towing vehicle controller of FIG. 1 applied in a towing vehicle of a towing and towed vehicle combination in accordance with an embodiment using manual and/or automatic inputs of trailer data obtained from an operator of the towing vehicle and/or from an associated source delivered or otherwise communicated to the towing vehicle, respectively, in accordance with an example embodiment.

In accordance with an example embodiment, the braking control apparatus includes a controller manual input operatively coupled with the processor. The controller manual configuration input receives a manual trailer configuration signal provided by an associated operator of the associated towing vehicle, the manual trailer configuration signal comprising the application trailer configuration data representative of the application value of the equipment parameter of the towed vehicle. In this regard, FIG. 7A is a functional block diagram illustrating the braking control apparatus 40 of FIGS. 1 and 2 applied in a towing vehicle 1 of a towing and towed vehicle combination 9 in accordance with an embodiment using manual input of trailer data obtained from an operator of the towing vehicle. In accordance with the embodiments herein, a braking control apparatus 40 is provided for use in an associated towing vehicle towing one or more towed vehicles as a combination vehicle. The braking control apparatus 40 in the example embodiment shown in FIG. 7A includes a processor 210 (FIG. 2), a controller manual configuration input 610 operatively coupled with the processor, a controller automatic configuration input 620 operatively coupled with the processor, a non-transient memory device 220 (FIG. 2) operatively coupled with the processor, and control logic 222 (FIG. 2) stored in the non-transient memory device and executable by the processor to perform braking control of the one or more vehicles of the combination vehicle.

The controller manual configuration input 610 is adapted to receive a manual combination vehicle configuration signal 612 comprising first combination vehicle configuration data representative of first combination vehicle configuration information. Preferably, the first combination vehicle configuration data representative of first combination vehicle configuration information is provided by an associated operator of the associated towing vehicle using a human interface device 375 such as a touch screen or the like positioned in the cab of the towing vehicle 1.

In the embodiment, the controller automatic configuration input 620 is adapted to receive an automatic combination vehicle configuration signal 622 comprising second combination vehicle configuration data representative of second combination vehicle configuration information. Preferably, the second combination vehicle configuration data representative of second combination vehicle configuration information is provided by the one or more towed vehicles of the combination vehicle using one or more suitable interfaces to be described in greater detail below.

In a preferred form, the braking control apparatus manual configuration input 610 comprises a human interface device 375 operatively coupled with the processor. During use of the system, the human interface device 375 receives from the associated operator of the associated towing vehicle 1, the manual combination vehicle configuration signal 612 comprising the first combination vehicle configuration data representative of the first combination vehicle configuration information.

The human interface device 375 of the braking control apparatus 40 according to the embodiment described may include one or more of a touch screen disposed in the towing vehicle of the combination vehicle, a dashboard console disposed in the towing vehicle of the combination vehicle, a headliner console disposed in the towing vehicle of the combination vehicle, and/or a cellular phone interface disposed in the towing vehicle of the combination vehicle for communication with a cellular phone in operable proximity relative to the cellular phone interface.

Figure 7B:
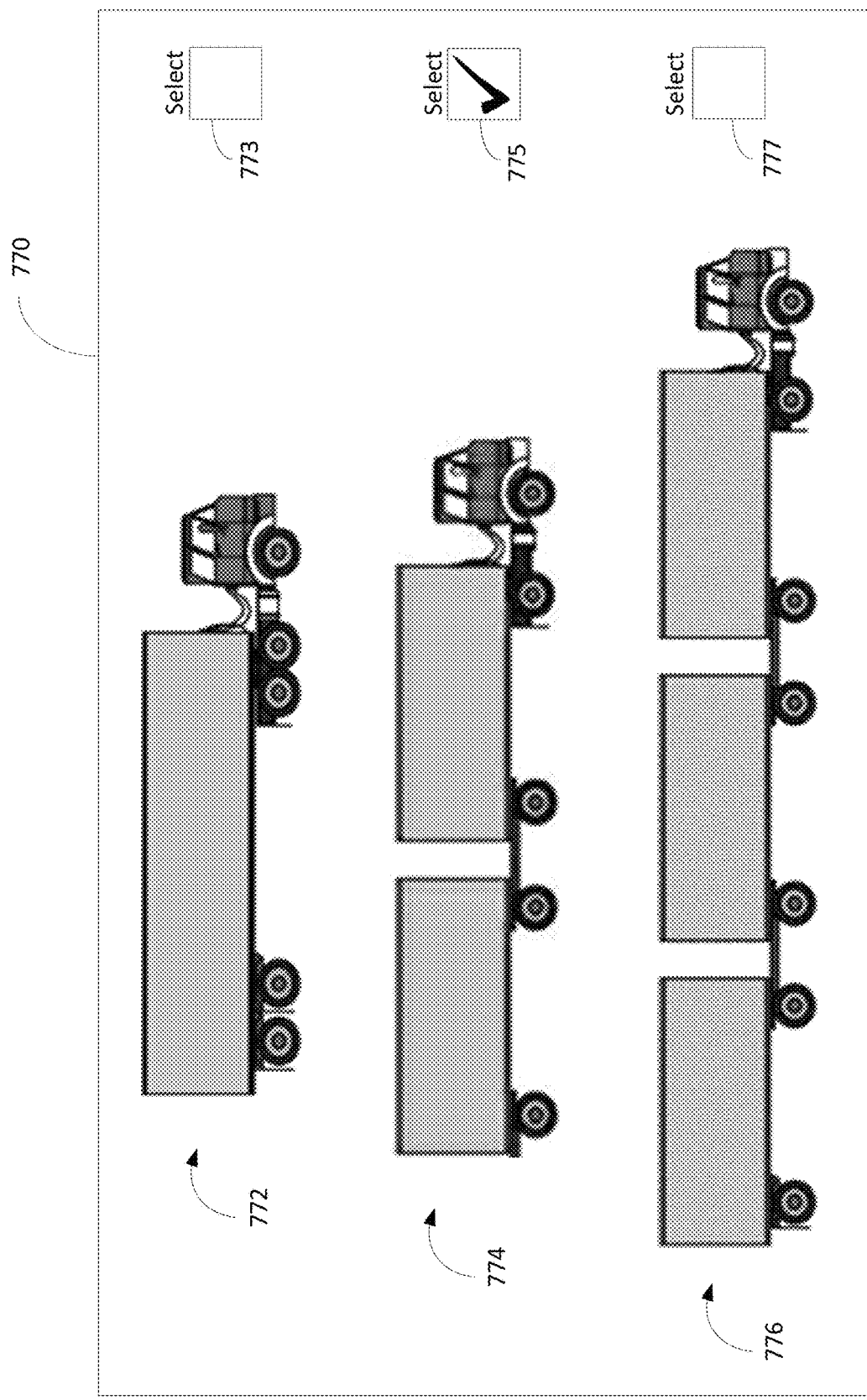
FIG. 7B is an example graphical representation of an image presented to a human operator on a human interface device of the towing vehicle braking control apparatus according to an example embodiment.

FIG. 7B is an example graphical representation of an image 770 presented to the human operator on the human interface device 375 of the braking control apparatus 40 according to an example embodiment. As shown, for example, in order to assist the operator in easily providing trailer capability data to the controller 40 without the need to input a large quantity of complicated data, the human interface device 375 may display an image 770 including a set of representative combination vehicles for selection by the operator. For example, the human interface device 375 may display a first image 772 of a first combination vehicle comprising a single towing vehicle and a single towed vehicle. The human interface device 375 may also display a second image 774 of a second combination vehicle comprising a single towing vehicle and a pair of two (2) towed vehicles. The human interface device 375 may still yet further display a third image 776 of a third combination vehicle comprising a single towing vehicle and a set of three (3) towed vehicles. The human operator may effect a selection by using a touch screen capability, for example, of human interface device 375. In the example, the human interface device 375 includes a first selection zone 773 for selection by the operator of the first combination vehicle comprising the single towing vehicle and the single towed vehicle, a second selection zone 775 for selection by the operator of the second combination vehicle comprising the single towing vehicle and the pair of towed vehicles or a third 777 selection zone for selection by the operator of the third combination vehicle comprising the single towing vehicle and the set of three towed vehicles. As shown, the operator has selected the second combination vehicle 774 as being representative of the particular physical arrangement of the combination vehicle. It is to be appreciated that the processor 210 is responsive to the selection by the operator of one of the graphical presentations 772, 774, 776 to retrieve from the memory 220 actual first combination vehicle configuration data representative of first combination vehicle configuration information indirectly provided by the operator of the towing vehicle via the selection 775. As described, this relieves the operator of the burden of the need to input a large quantity of complicated data and instead affords the opportunity to select the combination vehicle configuration from a simple graphical representation thereby saving time and also minimizing the chance of improper entry of incorrect data.

Further in the embodiment illustrated, the braking control apparatus automatic configuration input 620 comprises a communication circuit configured to transmit a request signal to the one or more towed vehicles of the combination vehicle, and to receive the automatic combination vehicle configuration signal from the one or more towed vehicles responsive to the request signal as one or more automatic combination vehicle configuration signals comprising the second combination vehicle configuration data representative of the second combination vehicle configuration information provided by the one or more towed vehicles of the combination vehicle. A suitable handshaking protocol is used in the example embodiment for communication between the towing.

Figure 7C:
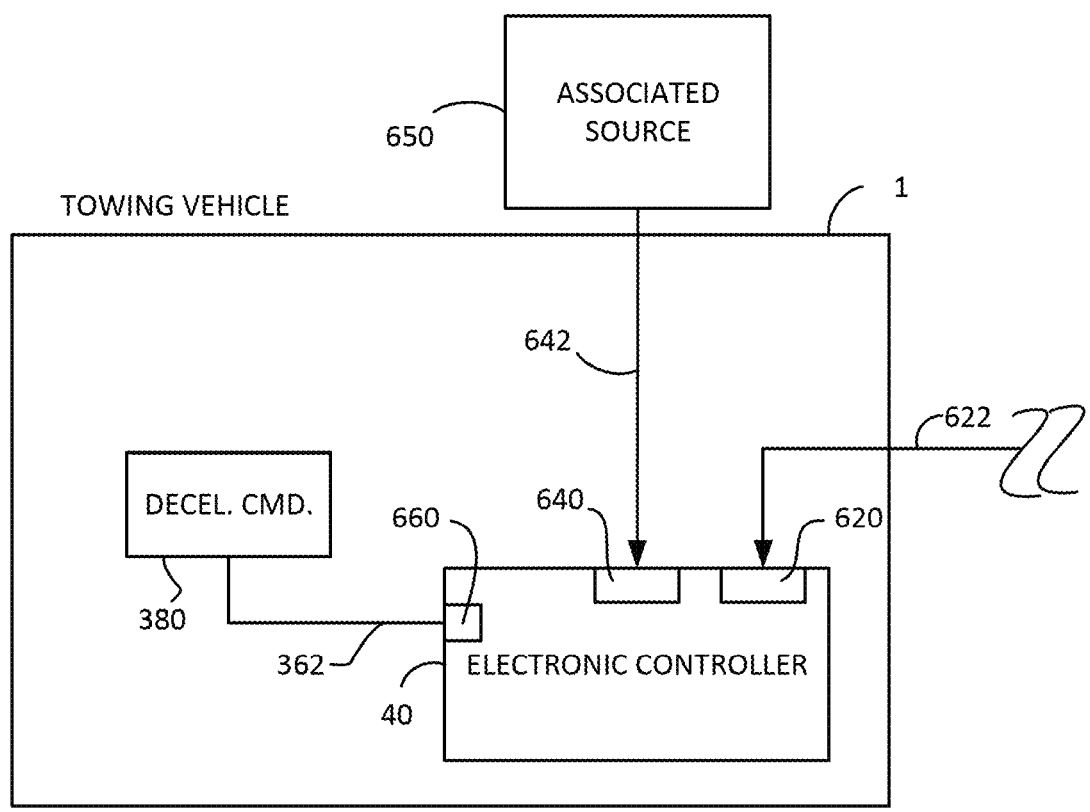
FIG. 7C is a functional block diagram illustrating the towing vehicle controller of FIG. 1 applied in a towing vehicle of a towing and towed vehicle combination in accordance with an embodiment using an automatic input of trailer data obtained from an associated source delivered or otherwise communicated to the towing vehicle.

FIG. 7C is a functional block diagram illustrating the braking control apparatus 40 of FIG. 1 applied in a towing vehicle 1 of a towing and towed vehicle combination in accordance with an embodiment using an automatic input of trailer data obtained from an associated source delivered or otherwise communicated to the towing vehicle. Similar to the embodiment described above in connection with FIG. 7A, the braking control apparatus 40 in accordance with the further example embodiment as shown in FIG. 7C includes a processor 210 (FIG. 2), a controller second automatic configuration input 620 operatively coupled with the processor, a non-transient memory device 220 operatively coupled with the processor, and control logic 222 stored in the non-transient memory device and executable by the processor to perform braking control of the one or more vehicles of the combination vehicle. In the embodiment of FIG. 7C, however, the controller further also includes a controller first automatic configuration input 640 operatively coupled with the processor 210.

The controller first automatic configuration input 640 of this embodiment is adapted to receive a first automatic combination vehicle configuration signal 642 comprising first combination vehicle configuration data from an associated source 650 representative of first combination vehicle configuration information. The controller second automatic configuration input 620 operatively coupled with the processor is adapted to receive a second automatic combination vehicle configuration signal 622 comprising second combination vehicle configuration data representative of second combination vehicle configuration information provided by the one or more towed vehicles of the combination vehicle. Preferably, the first combination vehicle configuration data representative of the first combination vehicle configuration information is provided by the associated source 650 in operative communication with the associated towing vehicle 1 using a communication interface such as a wired communication interface, a wireless communication interface or any other form of communicating the data from the associated source to the controller. The first combination vehicle configuration data may include, for example, information related to: the number of towed vehicles attached to the towing vehicle, a list of trailer unit numbers such as serial numbers or other indicia of the trailers for example, an amount of loading of the trailers, a number of axles of the combination vehicle and/or of the towed vehicles, ABS information including serial number, configuration, etc. and/or any other data or other information as may be necessary or desired.

In the embodiment, the controller second automatic configuration input 620 is adapted to receive an automatic combination vehicle configuration signal 622 comprising second combination vehicle configuration data representative of second combination vehicle configuration information. Preferably, the second combination vehicle configuration data representative of the second combination vehicle configuration information is provided by the one or more towed vehicles of the combination vehicle using one or more suitable interfaces to be described in greater detail below.

Figure 8A:
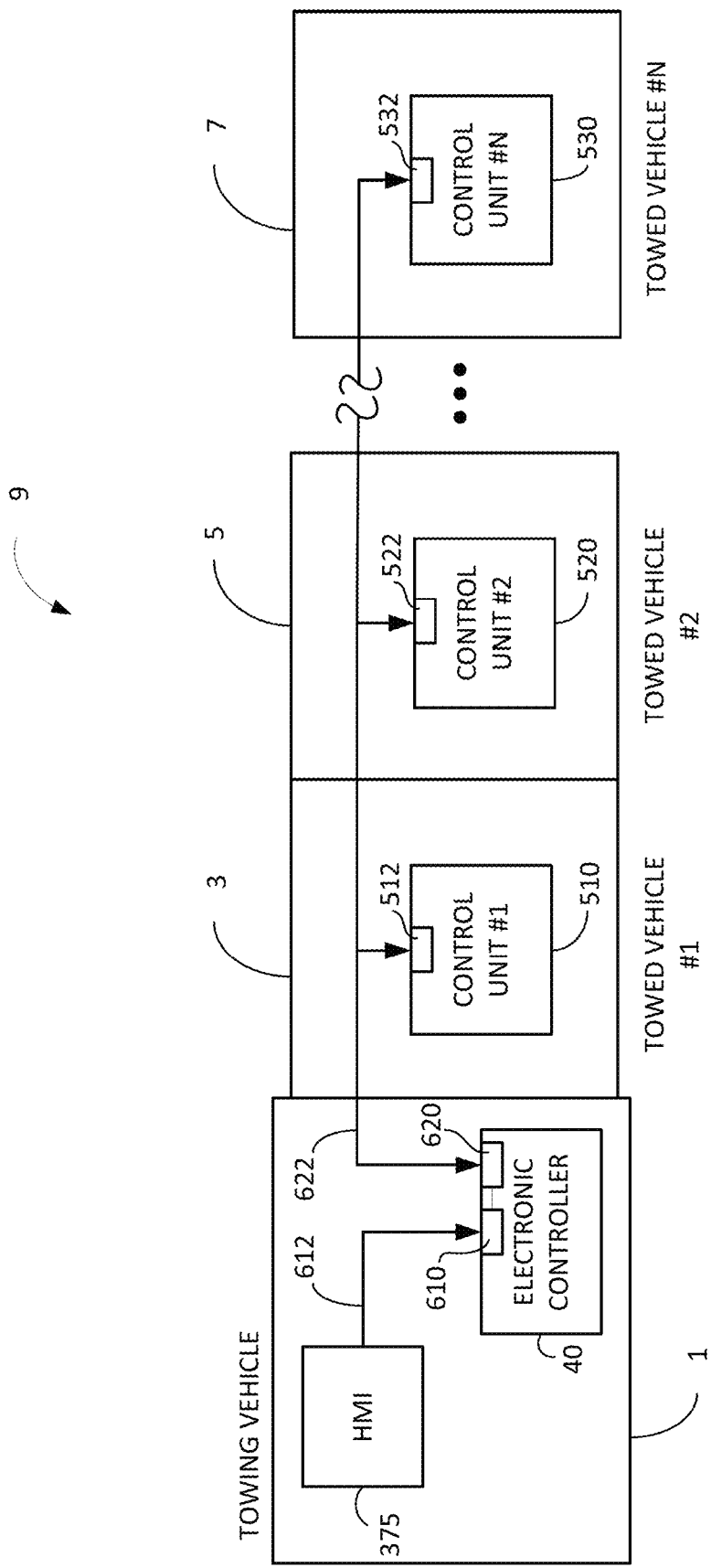
FIGS. 8A and 8B are a diagrammatic showings of a wired communication connection between the towing vehicle and several towed vehicles, and further showing local and remote towed vehicle configuration communication.
Figure 8B:
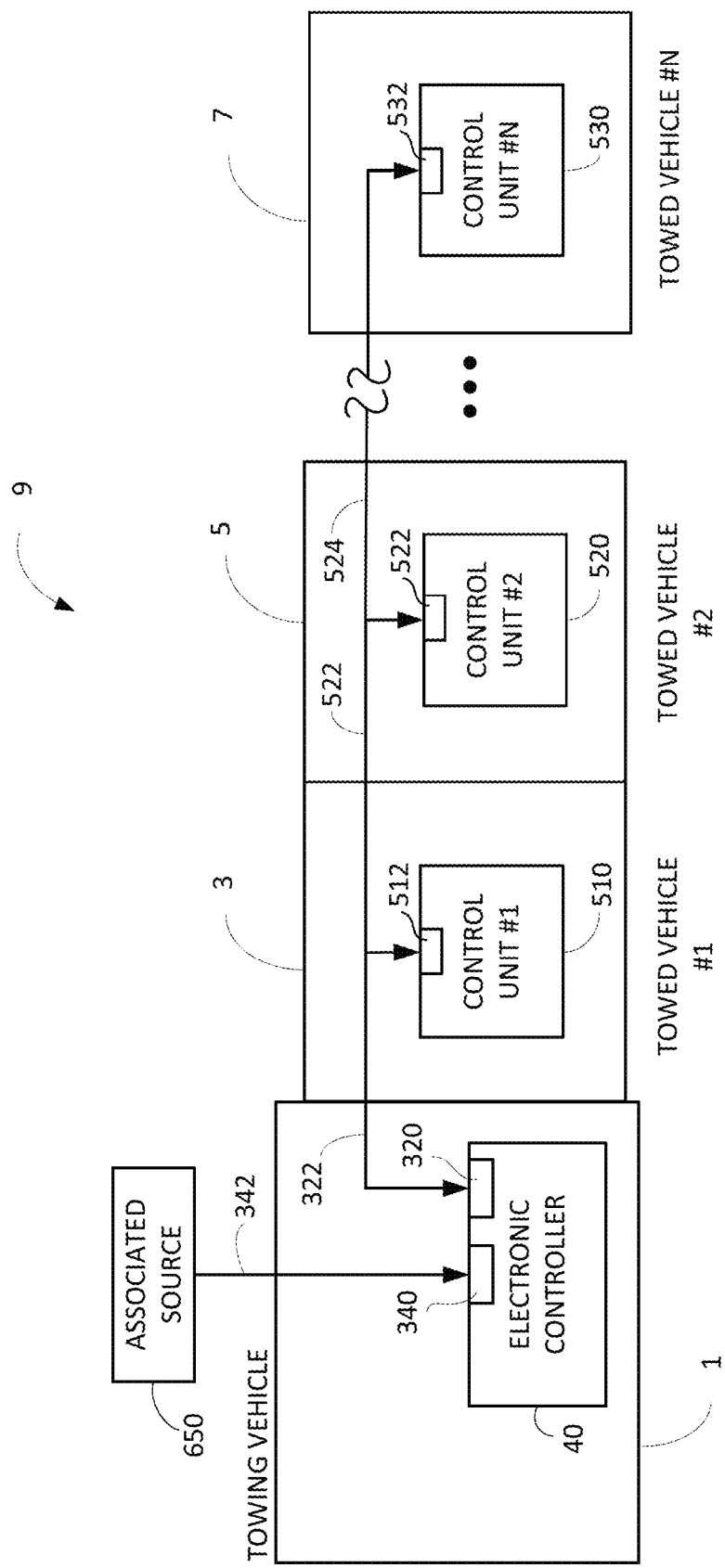

FIGS. 8A-8B are functional block diagrams illustrating the towing vehicle braking control apparatus 40 of FIGS. 1 and 2 applied in a towing vehicle 1 of a towed vehicle 3, 5, 7 combination vehicle 9. The braking control apparatus 40 may receive information from one or more other platooning vehicle platoon members via one or more radio frequency (RF) antennas for wireless communication of platoon control and command data, GPS data, and the like when the APC system is activated by the operator. The one or more antennas are mounted on the tractor or towing vehicle. The information from the one or more radio frequency (RF) antennas is received by an input on the braking control apparatus 40 or over the vehicle serial communication bus. The information received by the one or more radio frequency (RF) antennas 252 typically includes automated deceleration requests received as commands from one or more other platooning vehicles transmitting via the V2V Unicast and/or V2V Broadcast communication described above. A deceleration signal is created in response to the automated deceleration request when the APC system determines that the automated deceleration request is valid and that the tractor needs to decelerate in order to maintain a certain following distance between the tractor and a target vehicle transmitting the automated deceleration request to the tractor. The brake control logic 222 of the braking control apparatus 40 processes the automated deceleration requests to generate a brake control transmission signal to be sent to the brake control unit 622 of the towed vehicle 620. The brake control unit(s) of the towed vehicle(s) 601, 602, 603 react to the signal to appropriately apply the trailer brakes in accordance with the brake control transmission signal.

In addition to the above and in accordance with the example embodiment, the brake control logic of the braking control apparatus 40 is operable to receive capabilities and dynamic performance data related to the towing and towed vehicle combination. In further example embodiments herein, the braking control apparatus 40 selectively applies the towed vehicle brakes commensurate with a reduced brake level as applied to the towing vehicle and in accordance with capabilities and dynamic performance data related to the towing and towed vehicle combination. The capabilities and dynamic performance data includes in the example, a signal indicative of activation by an operator of a brake pedal of the towing vehicle, and one or more physical and/or environmental parameters of the towed vehicle such as, for example, a stability condition of the tractor, such as, for example, a yaw rate signal and a lateral acceleration signal from a yaw rate sensor 26 and lateral acceleration sensor.

FIG. 8A is a functional block diagram illustrating the braking control apparatus 40 of FIG. 1 applied in a towing vehicle 1 and towed vehicle 3, 5, 7 combination vehicle 9 in accordance with an embodiment wherein the first combination vehicle data is obtained or otherwise sent to the electronic controller 40 by a manual configuration input 610, and the second combination vehicle data is obtained or otherwise sent to the electronic controller 40 by an automatic configuration input 620. Similarly, FIG. 8B is a functional block diagram illustrating the braking control apparatus 40 of FIG. 1 applied in a towing vehicle 1 and towed vehicle 3, 5, 7 combination vehicle 9 in accordance with an embodiment wherein the first combination vehicle data is obtained or otherwise sent to a first automatic configuration input 640 of the electronic controller 40 from an associated source 650, and the second combination vehicle data is obtained or otherwise sent to the electronic controller 40 by the automatic configuration input 620.

In these example embodiments, the controller automatic configuration input braking control apparatus includes a wired communication circuit configured to receive the automatic combination vehicle configuration signal as one or more wired signals corresponding to the one or more towed vehicles. The wired communication circuit may include, as may be necessary and/or desired, one or more of a wired power line communication (PLC) communication circuit, an Ethernet network communication circuit, and/or a wired controller area network (CAN) communication circuit.

As shown in FIGS. 8A and 8B, the first towed vehicle 601 includes a control unit 610 having a communication interface 612 in operative communication with the automatic combination vehicle configuration signal 622 of the controller 40, and a second communication interface 614 in operative communication with a control unit 620 of the second towed vehicle 602 via a first communication interface 622 of the second towed vehicle 602. Similarly, the second towed vehicle 602 includes a control unit 620 having a communication interface 622 in operative communication with the second communication interface 614 of the first towed vehicle 601, and a second communication interface 624 in operative communication with a control unit 630 of the third towed vehicle 603 via a first communication interface 632 of the third towed vehicle 602. Using this wired connection strategy, the automatic combination vehicle configuration signals and other command and data signals are easily and efficiently communicated between the towed and towing vehicles. The wired communication circuit may include, as may be necessary and/or desired extending from between the towing vehicle 1 and the last in the series of towed vehicles 603, one or more of a wired power line communication (PLC) communication circuit, an Ethernet network communication circuit, and/or a wired controller area network (CAN) communication circuit.

FIG. 8A is a functional block diagram illustrating the braking control apparatus 40 of FIG. 1 applied in a towing vehicle 1 of a towing 1 and towed vehicle 3, 5, 7 combination vehicle 9 in accordance with an embodiment wherein the first combination vehicle data is obtained or otherwise sent to the electronic controller 40 by a manual configuration input 610, and the second combination vehicle data is obtained or otherwise sent wirelessly by control units of the towed vehicles to the electronic controller 40 by an automatic configuration input 620. Similarly, FIG. 8B is a functional block diagram illustrating the braking control apparatus 40 of FIG. 1 applied in a towing vehicle 1 of a towing 1 and towed vehicle 3, 5, 7 combination vehicle 9 in accordance with an embodiment wherein the first combination vehicle data is obtained or otherwise sent to a first automatic configuration input 640 of the electronic controller 40 from an associated source 650, and the second combination vehicle data is obtained or otherwise sent wirelessly by control units of the towed vehicles to the electronic controller 40 by the automatic configuration input 620.

In these example embodiments, the controller automatic configuration input braking control apparatus includes a wireless communication circuit configured to receive the automatic combination vehicle configuration signals from the control units of the towed vehicles as one or more wireless signals corresponding to the one or more towed vehicles. The wireless communication circuit may include, as may be necessary and/or desired, one or more of a wireless networking WiFi communication circuit, a wireless Bluetooth communication circuit, a wireless dedicated short range communications (DSRC) communication circuit, an LDP433 communication circuit, a radio frequency (RF) communication circuit, a wireless cellular communication circuit, and/or a wireless satellite communication circuit.

Figure 9B:
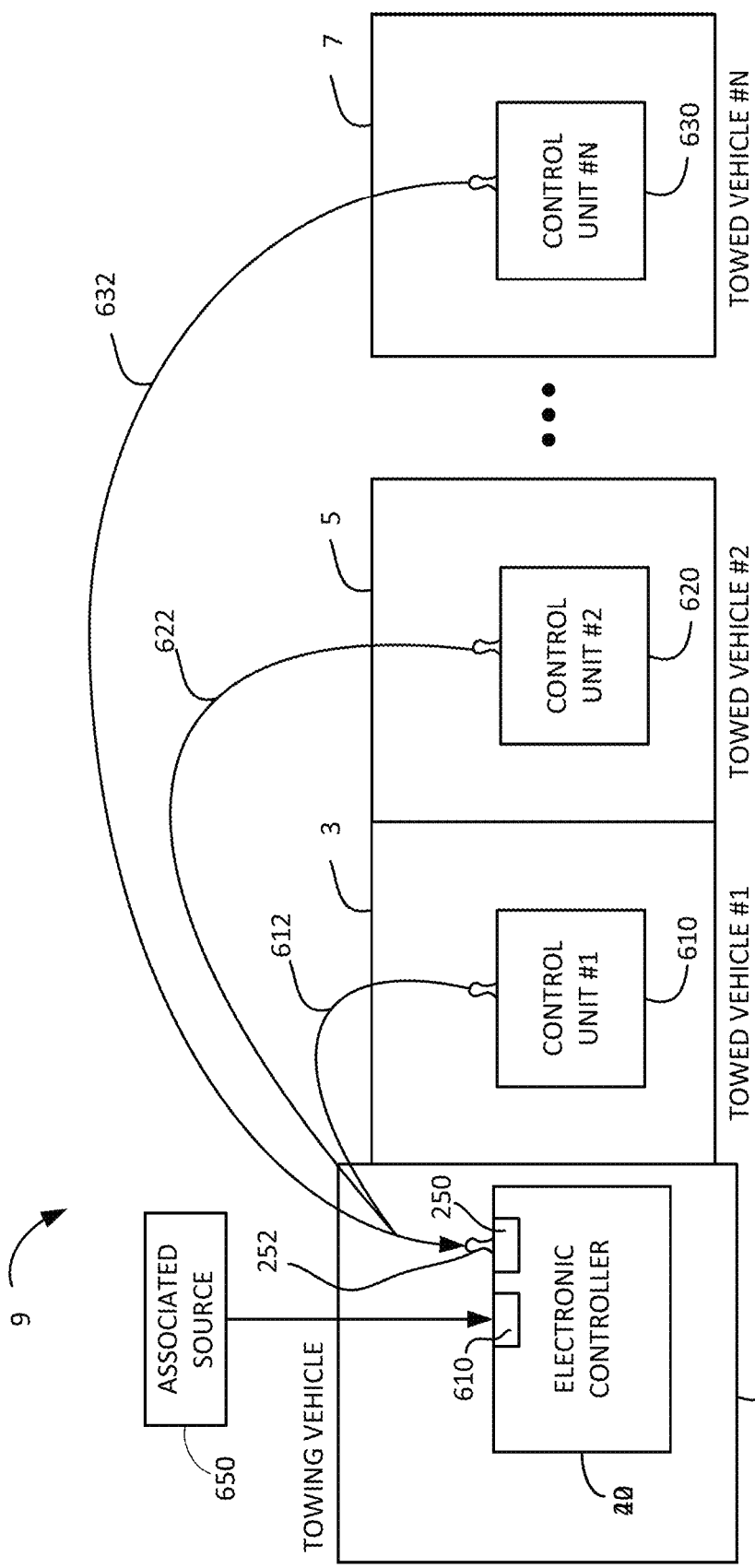

As shown in FIGS. 9A and 9B, the first towed vehicle 601 includes a control unit 610 having a transmitter/receiver (transceiver) module such as, for example, a radio frequency (RF) transmitter including one or more antennas 252 in operative communication with the transmitter/receiver (transceiver) module 250 (FIG. 1) of the controller 40. In that way, a wireless signal 612 can be sent from the control unit 610 of the first towed vehicle 601 to the controller 40 of the towing vehicle 1. Similarly, the second towed vehicle 602 includes a control unit 620 having a transmitter/receiver (transceiver) module such as, for example, a radio frequency (RF) transmitter including one or more antennas 252 in operative communication with the transmitter/receiver (transceiver) module 250 (FIG. 1) of the controller 40. In that way, a wireless signal 622 can be sent from the control unit 620 of the second towed vehicle 602 to the controller 40 of the towing vehicle 1. Lastly in the example embodiment, the third towed vehicle 603 includes a control unit 630 having a transmitter/receiver (transceiver) module such as, for example, a radio frequency (RF) transmitter including one or more antennas 252 in operative communication with the transmitter/receiver (transceiver) module 250 (FIG. 1) of the controller 40. In that way, a wireless signal 632 can be sent from the control unit 630 of the third towed vehicle 603 to the controller 40 of the towing vehicle 1. Using this direct wireless communication connection strategy, the automatic combination vehicle configuration signals and other command and data signals are easily and efficiently communicated between the towed and towing vehicles. The wireless communication circuit may include, as may be necessary and/or desired one or more of a wireless networking WiFi communication circuit, a wireless Bluetooth communication circuit, a wireless dedicated short range communications (DSRC) communication circuit, an LDP433 communication circuit, and/or a radio frequency (RF) communication circuit. It is to be appreciated that other wireless network topologies may also be used such as for example a mesh network in which case the one or more towed vehicles may communicate and thereby relay information.

FIG. 9A is a functional block diagram illustrating the braking control apparatus 40 of FIG. 1 applied in a towing vehicle 1 of a towing 1 and towed vehicle 3, 5, 7 combination vehicle 9 in accordance with an embodiment wherein the first combination vehicle data is obtained or otherwise sent to the electronic controller 40 by a manual configuration input 610, and the second combination vehicle data is obtained or otherwise sent wirelessly by control units of the towed vehicles to the electronic controller 40 by an automatic configuration input 620. Similarly, FIG. 9B is a functional block diagram illustrating the braking control apparatus 40 of FIG. 1 applied in a towing vehicle 1 of a towing 1 and towed vehicle 3, 5, 7 combination vehicle 9 in accordance with an embodiment wherein the first combination vehicle data is obtained or otherwise sent to a first automatic configuration input 640 of the electronic controller 40 from an associated source 650, and the second combination vehicle data is obtained or otherwise sent wirelessly by control units of the towed vehicles to the electronic controller 40 by the automatic configuration input 620.

In these example embodiments, the controller automatic configuration input braking control apparatus includes a wireless communication circuit configured to receive the automatic combination vehicle configuration signals from the control units of the towed vehicles as one or more wireless signals corresponding to the one or more towed vehicles. The wireless communication circuit may include, as may be necessary and/or desired, one or more of a wireless networking WiFi communication circuit using an intermediate unit or transceiver station 750, a wireless Bluetooth communication circuit using an intermediate transceiver station 750, a wireless dedicated short range communications (DSRC) communication circuit using an intermediate transceiver unit or station 750, an LDP433 communication circuit, a radio frequency (RF) communication circuit using an intermediate transceiver station 750, or a wireless cellular communication circuit using an intermediate transceiver unit or station 750.

Figure 10A:
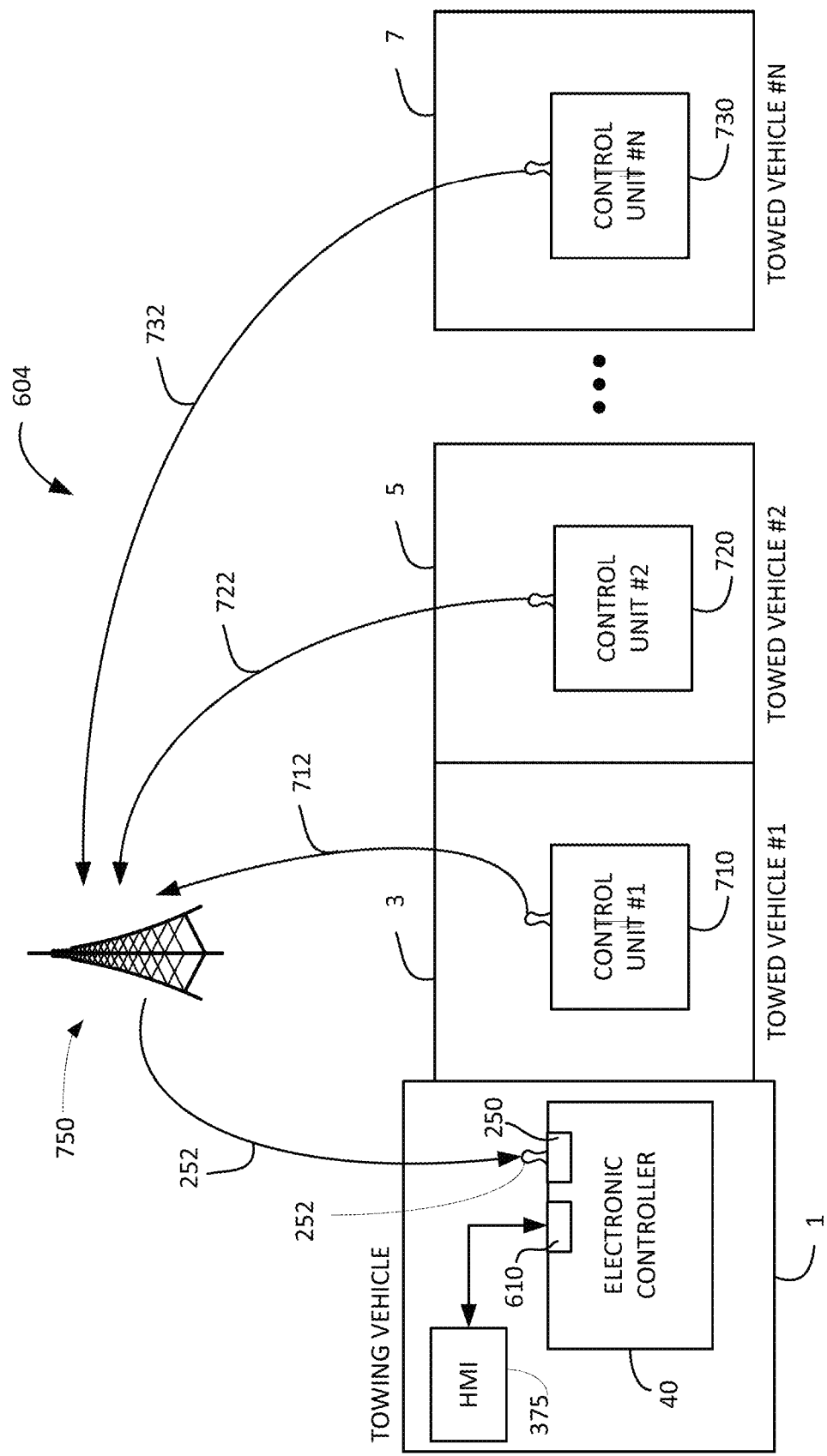
FIGS. 10A and 10B are diagrammatic showings of a wireless cellular communication connection between the towing vehicle and several towed vehicles, and further showing local and remote towed vehicle configuration communication.
Figure 10B:
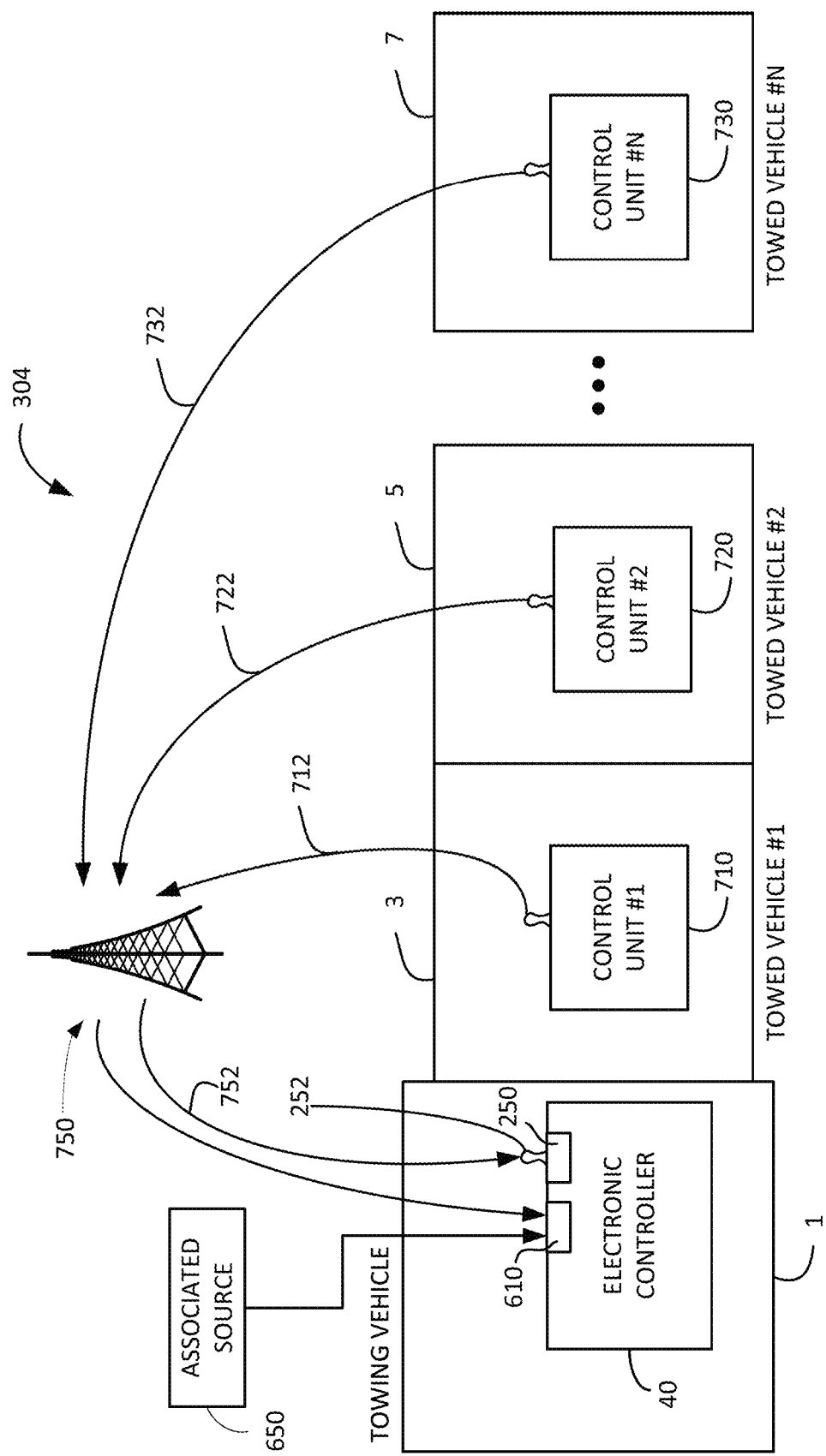

As shown in FIGS. 10A and 10B, the first towed vehicle 301 includes a control unit 710 having a transmitter/receiver (transceiver) module such as, for example, a wireless cellular communication transmitter including one or more antennas 252 in operative communication with the transmitter/receiver (transceiver) module 250 (FIG. 1) of the controller 22 via an intermediate wireless transceiver unit or station 750. In that way, a wireless signal 712 can be sent from the control unit 710 of the first towed vehicle 601 to the intermediate wireless transceiver unit or station 750, and then in turn to the controller 40 of the towing vehicle 1. Similarly, the second towed vehicle 602 includes a control unit 720 having a transmitter/receiver (transceiver) module such as, for example, a wireless cellular communication transmitter including one or more antennas 252 in operative communication with the transmitter/receiver (transceiver) module 250 (FIG. 1) of the controller 40 via an intermediate wireless transceiver unit or station 750. In that way, a wireless signal 722 can be sent from the control unit 720 of the second towed vehicle 602 to the intermediate wireless transceiver unit or station 750, and then in turn to the controller 40 of the towing vehicle 1. Lastly in the example embodiment, the third towed vehicle 303 includes a control unit 730 having a transmitter/receiver (transceiver) module such as, for example, a wireless cellular communication transmitter including one or more antennas 252 in operative communication with the transmitter/receiver (transceiver) module 250 (FIG. 1) of the controller 40 via an intermediate wireless transceiver unit or station 750. In that way, a wireless signal 732 can be sent from the control unit 730 of the second towed vehicle 603 to the intermediate wireless transceiver unit or station 750, and then in turn to the controller 40 of the towing vehicle 1. Using this indirect wireless communication connection strategy, the automatic combination vehicle configuration signals and other command and data signals are easily and efficiently communicated between the towed and towing vehicles. The wireless communication circuit may include, as may be necessary and/or desired one or more of one or more of a wireless networking WiFi communication circuit using an intermediate unit or transceiver station 750, a wireless Bluetooth communication circuit using an intermediate transceiver station 750, a wireless dedicated short range communications (DSRC) communication circuit using an intermediate transceiver unit or station 750, an LDP433 communication circuit, a radio frequency (RF) communication circuit using an intermediate transceiver station 750, or a wireless cellular communication circuit using an intermediate transceiver unit or station 750. It is to be appreciated that the associated source may be provided wirelessly as shown in the drawing Figure.

FIG. 10A is a functional block diagram illustrating the towing vehicle braking control apparatus 40 of FIG. 1 applied in a towing vehicle 1 of a towing 1 and towed vehicle 3, 5, 7 combination vehicle 9 in accordance with an embodiment wherein the first combination vehicle data is obtained or otherwise sent to the electronic controller 40 by a manual configuration input 610, and the second combination vehicle data is obtained or otherwise sent wirelessly by control units of the towed vehicles to the electronic controller 40 by an automatic configuration input 620. Similarly, FIG. 10B is a functional block diagram illustrating the braking control apparatus 40 of FIG. 1 applied in a towing vehicle 1 of a towing 1 and towed vehicle 3, 5, 7 combination vehicle 9 in accordance with an embodiment wherein the first combination vehicle data is obtained or otherwise sent to a first automatic configuration input 640 of the electronic controller 40 from an associated source 650, and the second combination vehicle data is obtained or otherwise sent wirelessly by control units of the towed vehicles to the electronic controller 40 by the automatic configuration input 620.

In these example embodiments, the controller automatic configuration input braking control apparatus includes a wireless communication circuit configured to receive the automatic combination vehicle configuration signals from the control units of the towed vehicles as one or more wireless signals corresponding to the one or more towed vehicles. The wireless communication circuit may include, as may be necessary and/or desired, a wireless satellite communication circuit sending and receiving wireless satellite communication signals to an associated satellite 850.

Figure 11A:
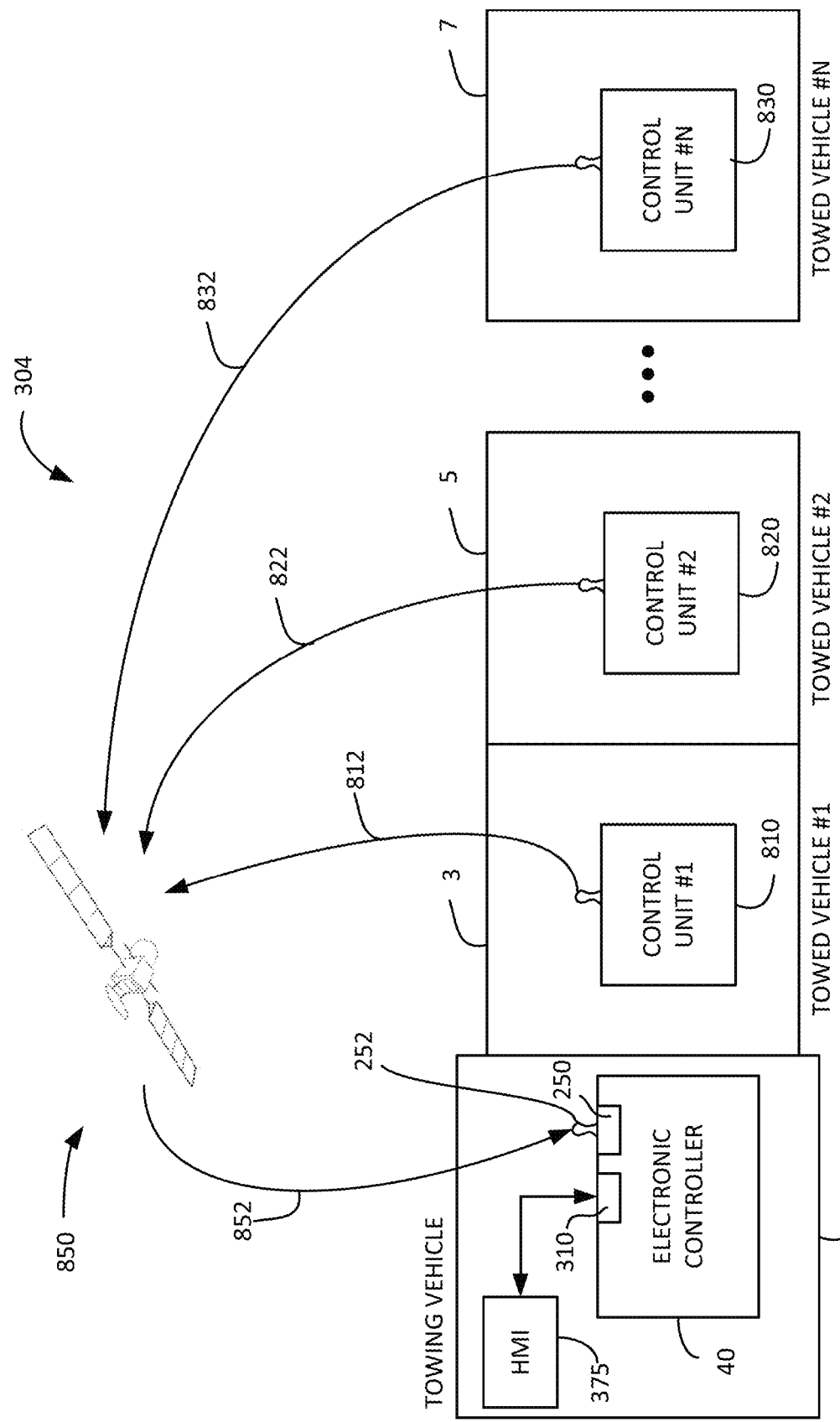
FIGS. 11A and 11B are diagrammatic showings of a wireless satellite communication connection between the towing vehicle and several towed vehicles, and further showing local and remote towed vehicle configuration communication.
Figure 11B:
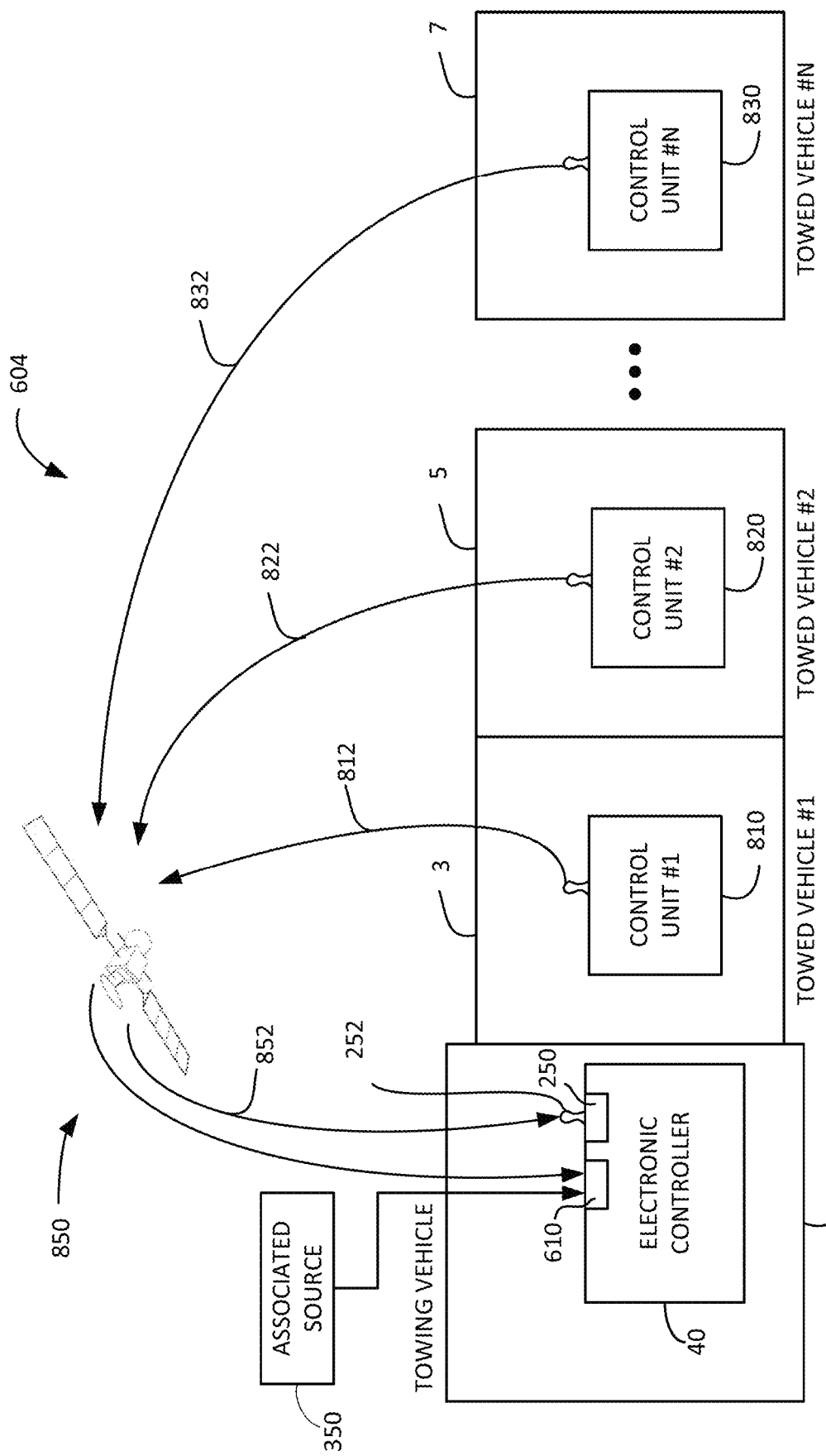

As shown in FIGS. 11A and 11B, the first towed vehicle 3 includes a control unit 810 having a transmitter/receiver (transceiver) module such as, for example, a wireless satellite communication transmitter including one or more antennas 252 in operative communication with the transmitter/receiver (transceiver) module 250 (FIG. 1) of the controller 40 via an intermediate wireless satellite unit or station 850. In that way, a wireless signal 812 can be sent from the control unit 810 of the first towed vehicle 3 to the intermediate wireless satellite unit or station 850, and then in turn to the controller 40 of the towing vehicle 1. Similarly, the second towed vehicle 5 includes a control unit 820 having a transmitter/receiver (transceiver) module such as, for example, a wireless satellite communication transmitter including one or more antennas 252 in operative communication with the transmitter/receiver (transceiver) module 250 (FIG. 1) of the controller 40 via an intermediate wireless satellite transceiver unit or station 850. In that way, a wireless signal 822 can be sent from the control unit 820 of the second towed vehicle 5 to the intermediate wireless transceiver satellite unit or station 850, and then in turn to the controller 40 of the towing vehicle 1. Lastly in the example embodiment, the third towed vehicle 7 includes a control unit 830 having a transmitter/receiver (transceiver) module such as, for example, a wireless satellite communication transmitter including one or more antennas 252 in operative communication with the transmitter/receiver (transceiver) module 250 (FIG. 1) of the controller 40 via an intermediate wireless satellite transceiver unit or station 850. In that way, a wireless signal 832 can be sent from the control unit 830 of the second towed vehicle 603 to the intermediate wireless satellite transceiver unit or station 850, and then in turn to the controller 40 of the towing vehicle 1. Using this indirect wireless communication connection strategy using one or more satellites 850, the automatic combination vehicle configuration signals and other command and data signals are easily and efficiently communicated between the towed and towing vehicles. The wireless communication circuit may include, as may be necessary and/or desired one or more of a wireless satellite communication circuit using an intermediate satellite transceiver unit or station 850. It is to be appreciated that the associated source may be provided wirelessly such as shown in the drawing Figure by satellite communication, for example.

Figure 12A:
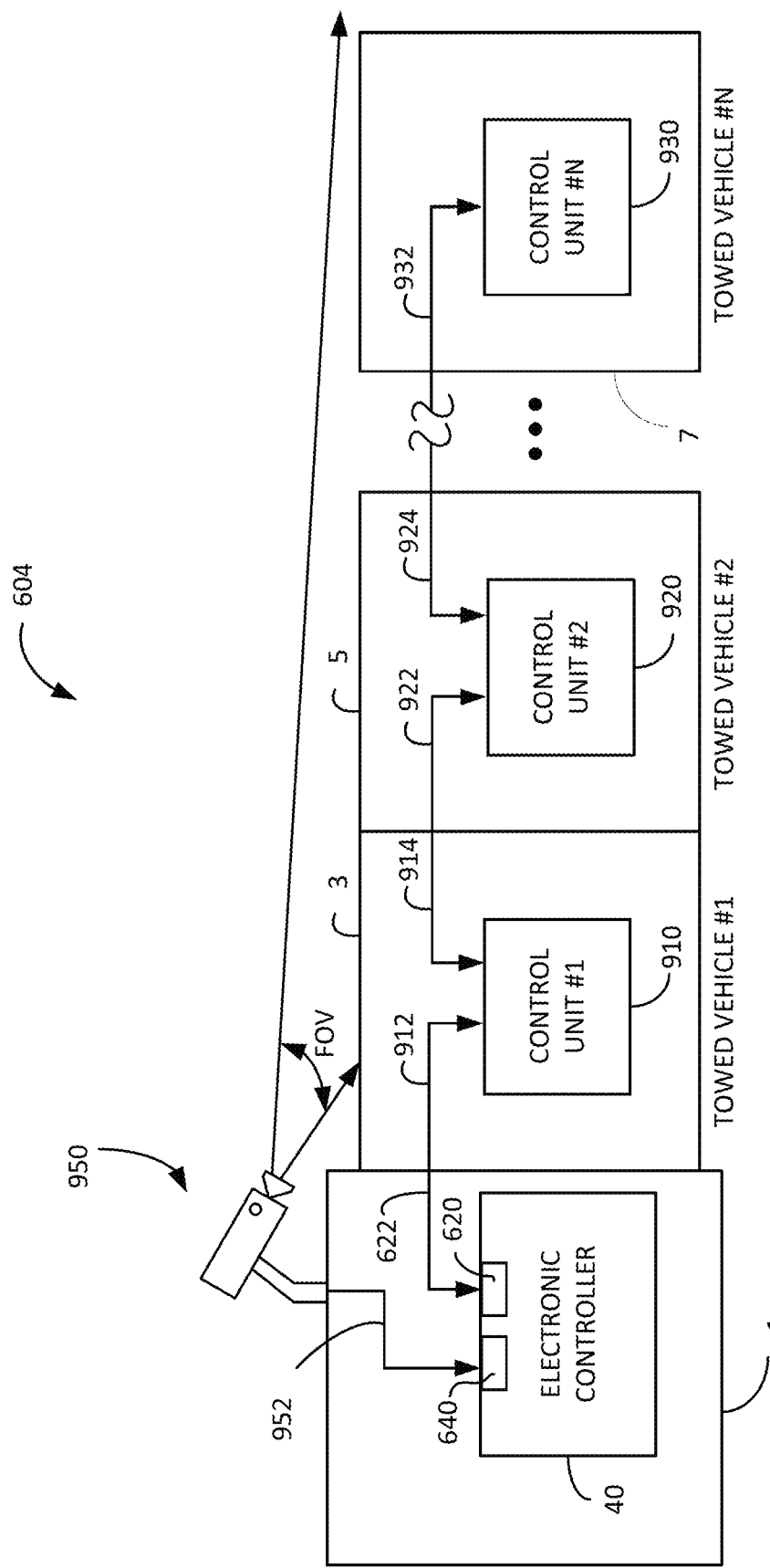
FIGS. 12A and 12B are a diagrammatic showings of a wired communication connection between the towing vehicle and several towed vehicles, and further showing local and remote towed vehicle image data acquisition.

FIG. 12A is a functional block diagram illustrating the braking control apparatus 40 of FIG. 1 applied in a towing vehicle 1 of a towing 1 and towed vehicle 3, 5, 7 combination vehicle 9 in accordance with an embodiment wherein the first combination vehicle data is obtained or otherwise sent to the electronic controller 40 by an automatic configuration input 640 from an associated local camera source 950, and the second combination vehicle data is obtained or otherwise sent to the electronic controller 40 by an automatic configuration input 620. Similarly, FIG. 11B is a functional block diagram illustrating the braking control apparatus 40 of FIG. 1 applied in a towing vehicle 1 of a towing 1 and towed vehicle 3, 5, 7 combination vehicle 9 in accordance with an embodiment wherein the first combination vehicle data is obtained or otherwise sent to a first automatic configuration input 640 of the electronic controller 40 from an associated remote camera source 960, and the second combination vehicle data is obtained or otherwise sent to the electronic controller 40 by the automatic configuration input 620.

In these example embodiments, the controller automatic configuration input braking control apparatus includes a wired communication circuit configured to receive the automatic combination vehicle configuration signal as one or more wired signals corresponding to the one or more towed vehicles. The wired communication circuit may include, as may be necessary and/or desired, one or more of a wired power line communication (PLC) communication circuit, an Ethernet network communication circuit, and/or a wired controller area network (CAN) communication circuit.

Figure 12B:
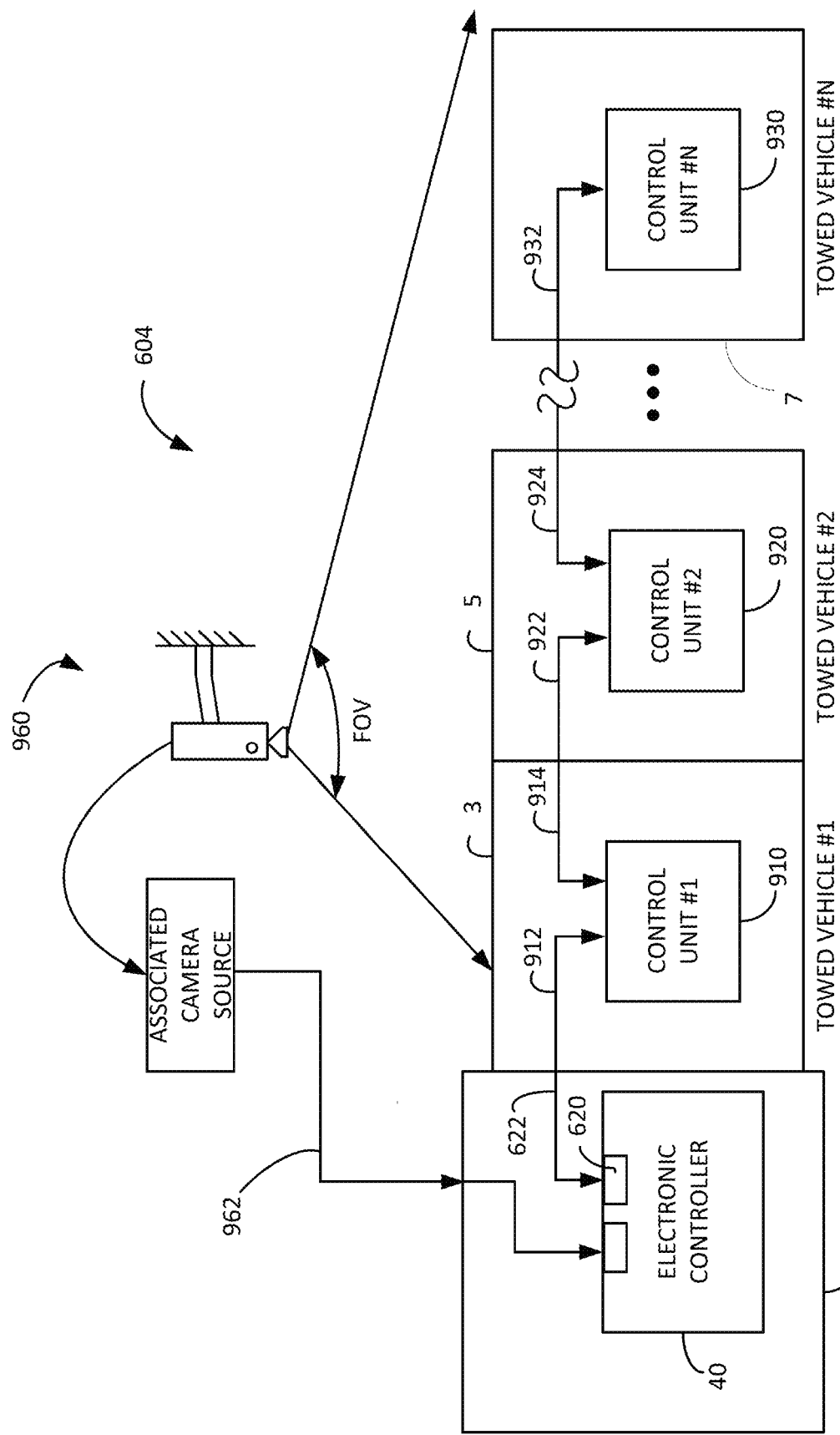

As shown in FIGS. 12A and 12B, the first towed vehicle 3 includes a control unit 910 having a communication interface 912 in operative communication with the automatic combination vehicle configuration signal 622 of the controller 40, and a second communication interface 914 in operative communication with a control unit 920 of the second towed vehicle 602 via a first communication interface 922 of the second towed vehicle 602. Similarly, the second towed vehicle 5 includes a control unit 920 having a communication interface 922 in operative communication with the second communication interface 914 of the first towed vehicle 3, and a second communication interface 924 in operative communication with a control unit 930 of the third towed vehicle 7 via a first communication interface 932 of the third towed vehicle 602. Using this daisy chain wired connection strategy, the automatic combination vehicle configuration signals and other command and data signals are easily and efficiently communicated between the towed and towing vehicles. The wired communication circuit may include, as may be necessary and/or desired extending from between the towing vehicle 1 and the last in the series of towed vehicles 603, one or more of a wired power line communication (PLC) communication circuit, an Ethernet network communication circuit, and/or a wired controller area network (CAN) communication circuit.

Further in the embodiment illustrated, the controller first automatic configuration input comprises a communication circuit in operative selective communication with one or more associated camera devices positioned relative to the one or more towed vehicles to obtain at least one image of the one or more towed vehicles and deliver the at least one image to the wireless communication circuit as the first combination vehicle configuration data. In the embodiment shown in FIG. 12A, the associated local camera 950 is mounted on the towing vehicle in a manner to have the towed vehicles 3, 5, 7 with the field of view (FOV) of the camera 950, thereby providing the controller with data representative of the number of towed vehicles being towed by the towing vehicle. It is to be appreciated that the one or more towed vehicles need not always be within the FOV of the camera, but rather only need to be within the FOV for a period of time sufficient to allow inspection of the towed units by the camera such as might be available to the camera when the combination vehicle is turning, or the like. Similarly, as shown in the embodiment of FIG. 12B, the associated remote camera 960 is mounted on an associated structure removed from the combination vehicle such as, for example, mounted to a wall at a truck depot. The associated remote camera 960 is mounted on the associated structure in such a manner as to have the towed vehicles 3, 5, 7 with the field of view (FOV) of the camera 960, thereby providing the controller with data representative of the number of towed vehicles being towed by the towing vehicle.

It is to be appreciated that, although local and remote camera devices are illustrated in the Figures, the trailer data acquisition devices may be one or more radar devices operatively coupled with the controller first automatic configuration input. In this alternative embodiment, the one or more radar devices are positioned relative to the one or more towed vehicles and are thereby operable to obtain at least one distance measure of the one or more towed vehicles relative to the towing vehicle for delivering the at least one distance measure to the controller first automatic configuration input as the first combination vehicle configuration data.

It is further to be appreciated that, although local and remote camera devices are illustrated in the Figures, the trailer data acquisition devices may also be one or more Light Detection and Ranging (LIDAR) sensor devices operatively coupled with the controller first automatic configuration input. In this alternative embodiment, the one or more LIDAR devices are positioned relative to the one or more towed vehicles and are thereby operable to obtain at least one range measure of the one or more towed vehicles relative to the towing vehicle for delivering the at least one range measure to the controller first automatic configuration input as the first combination vehicle configuration data.

It is to be understood that other embodiments will be utilized and structural and functional changes will be made without departing from the scope of the present invention. The foregoing descriptions of embodiments of the present invention have been presented for the purposes of illustration and description. It is not intended to be exhaustive or to limit the invention to the precise forms disclosed. Accordingly, many modifications and variations are possible in light of the above teachings. It is therefore intended that the scope of the invention be limited not by this detailed description.

The invention claimed is:

1. A braking control apparatus operable in a brake control system of a brake system of an associated towing vehicle towing a towed vehicle as a combination vehicle, the braking control apparatus comprising:
    a processor;
    a non-transient memory device operatively coupled with the processor, the non-transient memory device storing:
        default trailer model data representative of a default trailer braking model used by the braking control apparatus to generate a default trailer braking control signal used to activate brakes on a default towed vehicle;
    control logic stored in the non-transient memory device and executable by the processor to:
        generate an application trailer braking model different than the default trailer braking model based on:
            application trailer configuration data received by the braking control apparatus, wherein the application trailer configuration data is representative of an application value of an equipment parameter of the towed vehicle, or
            the default trailer braking model and the received application trailer configuration data; and
        determine compensated trailer braking control data by applying primal trailer braking control data representative of a primal trailer braking control signal to the generated application trailer braking model; and
    an output circuit operatively coupled with the processor, the output circuit being responsive to the compensated trailer braking control data to generate a compensated trailer braking control signal for delivery to a modulator valve of the brake control system of the brake system of the associated towing vehicle that is responsive to the compensated trailer braking control signal to activate brakes on the towed vehicle based on the compensated trailer braking control signal.

2. The braking control apparatus according to claim 1, wherein:
    the control logic is executable by the processor based on the braking control apparatus not receiving the application trailer configuration data to:
        determine default trailer braking control data by applying the primal trailer braking control data representative of the primal trailer braking control signal to the default trailer braking model; and
    the output circuit is responsive to the default trailer braking control data to generate the default trailer braking control signal for delivery to the modulator valve of the braking control apparatus of the associated towing vehicle that is responsive to the default trailer braking control signal to activate the brakes on the towed vehicle based on the default trailer braking control signal.

3. A braking control apparatus operable in a brake control system of a brake system of an associated towing vehicle towing a towed vehicle as a combination vehicle, the braking control apparatus comprising:
    a processor;
    a non-transient memory device operatively coupled with the processor, the non-transient memory device storing:
        default trailer model data representative of a default trailer braking model used by the braking control apparatus to generate a default trailer braking control signal used to activate brakes on a default towed vehicle;
    control logic stored in the non-transient memory device and executable by the processor to:
        determine an application trailer braking model different than the default trailer braking model based on received application trailer configuration data received by the braking control apparatus representative of an application value of an equipment parameter of the towed vehicle by:
            selecting the application trailer braking model different than the default trailer braking model from a plurality of application trailer braking models different than the default trailer braking model stored in the non-transient memory device based on the application trailer configuration data received by the braking control apparatus; and
        determine compensated trailer braking control data by applying primal trailer braking control data representative of a primal trailer braking control signal to the selected application trailer braking model; and
    an output circuit operatively coupled with the processor and being responsive to the compensated trailer braking control data to generate a compensated trailer braking control signal for delivery to a modulator valve of the brake control system of the brake system of the associated towing vehicle that is responsive to the compensated trailer braking control signal to activate brakes on the towed vehicle based on the compensated trailer braking control signal.

4. The braking control apparatus according to claim 3, wherein:
    the control logic is executable by the processor to select the application trailer braking model from the plurality of application trailer braking models stored in the non-transient memory device based on:
        determining that the application value of the equipment parameter of the towed vehicle represented by the application trailer configuration data is within a first predetermined range.

5. The braking control apparatus according to claim 1, wherein:
    the non-transient memory device stores:
        a default value of the equipment parameter corresponding to the default trailer model data representative of the default trailer braking model used by the braking control apparatus to generate the default trailer braking signal used to activate brakes on the default towed vehicle having the default value of the equipment parameter; and
    the control logic is executable by the processor to generate the application trailer braking model based on the default trailer braking model and the application trailer configuration data by:

determining a difference between the default value of the equipment parameter and the application value of the equipment parameter; and modifying the default trailer braking model to generate the application trailer braking model by applying the difference to the default trailer braking model using a modification function.

6. The braking control apparatus according to claim 1, wherein:

the control logic is executable by the processor to generate the application trailer braking model based on the default trailer braking model and the application trailer configuration data by:

modifying the default trailer braking model to generate the application trailer braking model by applying the application value of the equipment parameter to the default trailer braking model using a modification function.

7. The braking control apparatus according to claim 1, further comprising:

a controller manual input operatively coupled with the processor, the controller manual configuration input receiving a manual trailer configuration signal provided by an associated operator of the associated towing vehicle, the manual trailer configuration signal comprising the application trailer configuration data representative of the application value of the equipment parameter of the towed vehicle.

8. The braking control apparatus according to claim 1, further comprising:

a controller automatic input operatively coupled with the processor, the controller automatic configuration input receiving an automatic trailer configuration signal from an associates source external to the combination vehicle and external to the braking control apparatus, the automatic trailer configuration signal comprising the application trailer configuration data representative of the application value of the equipment parameter of the towed vehicle.

9. A method in a brake control system of an associated towing vehicle for generating a compensated trailer braking control signal to activate brakes on a towed vehicle being towed by the associated towing vehicle as a combination vehicle, the method comprising:

storing default trailer model data in a non-transient memory device operatively coupled with a processor of a braking control apparatus of the brake control system, the default trailer model data being representative of a default trailer braking model used by the braking control apparatus to generate a default trailer braking control signal used to activate brakes on a default towed vehicle;

executing by the processor control logic stored in the non-transient memory device to:

generate an application trailer braking model different than the default trailer braking model based on:

application trailer configuration data received by the braking control apparatus, wherein the application trailer configuration data is representative of an application value of an equipment parameter of the towed vehicle, or the default trailer braking model and the received application trailer configuration data; and determine compensated trailer braking control data by applying primal trailer braking control data representative of a primal trailer braking control signal to the generated application trailer braking model; and generating by an output circuit operatively coupled with the processor responsive to the compensated trailer braking control data a compensated trailer braking control signal, the compensated trailer braking control signal for delivery to a modulator valve of the brake control system of the associated towing vehicle that is responsive to the compensated trailer braking control signal to activate activating brakes on the towed vehicle based on the compensated trailer braking control signal.

10. The method according to claim 9:

wherein the executing the control logic by the processor comprises:

executing the control logic by the processor based on the braking control apparatus not receiving the application trailer configuration data to:

determine default trailer braking control data by applying the primal trailer braking control data representative of the primal trailer braking control signal to the default trailer braking model; and further comprising generating by the output circuit responsive to the default trailer braking control data the default trailer braking control signal for delivery to the modulator valve of the brake control system of the associated towing vehicle that is responsive to the default trailer braking control signal to activate the brakes on the towed vehicle based on the default trailer braking control signal.

11. A method in a brake control system of an associated towing vehicle for generating a compensated trailer braking control signal to activate brakes on a towed vehicle being towed by the associated towing vehicle as a combination vehicle, the method comprising:

storing default trailer model data in a non-transient memory device operatively coupled with a processor of a braking control apparatus of the brake control system, the default trailer model data being representative of a default trailer braking model used by the braking control apparatus to generate a default trailer braking control signal used to activate brakes on a default towed vehicle;

executing the control logic by the processor to:

determine an application trailer braking model different than the default trailer braking model based on received application trailer configuration data received by the braking control apparatus representative of an application value of an equipment parameter of the towed vehicle by:

selecting the application trailer braking model different than the default trailer braking model from a plurality of application trailer braking models different than the default trailer braking model stored in the non-transient memory device based on the application trailer configuration data received by the braking control apparatus; and determine compensated trailer braking control data by applying primal trailer braking control data representative of a primal trailer braking control signal to the selected application trailer braking model; and generating, by an output circuit operatively coupled with the processor and being responsive to the compensated trailer braking control data, a compensated trailer braking control signal for delivery to a modulator valve of the brake control system of the brake system of the associated towing vehicle that is responsive to the compensated trailer braking control signal to activate brakes on the towed vehicle based on the compensated trailer braking control signal.

12. The method according to claim 11, wherein:
the selecting the application trailer braking model comprises executing the control logic by the processor to select the application trailer braking model from the plurality of application trailer braking models stored in the non-transient memory device based on:
determining that the application value of the equipment parameter of the towed vehicle represented by the application trailer configuration data is within a first predetermined range.

13. The method according to claim 9, further comprising:
storing a default value of the equipment parameter corresponding to the default trailer model data in the non-transient memory device, wherein the default value of the equipment parameter corresponding to the default trailer model data representative of the default trailer braking model used by the braking control apparatus to generate the default trailer braking signal used to activate brakes on the default towed vehicle having the default value of the equipment parameter,
wherein the executing the control logic by the processor comprises executing the control logic by the processor to generate the application trailer braking model based on the default trailer braking model and the application trailer configuration data by:
determining a difference between the default value of the equipment parameter and the application value of the equipment parameter; and
modifying the default trailer braking model to generate the application trailer braking model by applying the difference to the default trailer braking model using a modification function.

14. The method according to claim 9, wherein:
the executing the control logic by the processor to generate the application trailer braking model based on the default trailer braking model and the application trailer configuration data comprises:
modifying the default trailer braking model to generate the application trailer braking model by applying the application value of the equipment parameter to the default trailer braking model using a modification function.

15. The method according to claim 9, further comprising:
receiving a manual trailer configuration signal provided by an associated operator of the associated towing vehicle via a controller manual input operatively coupled with the processor, the manual trailer configuration signal comprising the application trailer configuration data representative of the application value of the equipment parameter of the towed vehicle.

16. The method according to claim 9, further comprising:
receiving an automatic trailer configuration signal from an associates source external to the associated combination vehicle and external to the braking control apparatus via a controller automatic input operatively coupled with the processor, the automatic trailer configuration signal comprising the application trailer configuration data representative of the application value of the equipment parameter of the towed vehicle.

17. A non-transient computer readable medium storing instructions thereon that when executed by a processor of a braking control apparatus of a brake control system of an associated towing vehicle performs a method for generating a compensated trailer braking control signal to activate brakes on a towed vehicle being towed by the associated towing vehicle as a combination vehicle, the method comprising:
generating an application trailer braking model different than a stored default trailer braking model based on:
received application trailer configuration data, wherein the application trailer configuration data is representative of an application value of an equipment parameter of the towed vehicle, or
the default trailer braking model and the received application trailer configuration data; and
determining compensated trailer braking control data by applying primal trailer braking control data representative of a primal trailer braking control signal to the generated application trailer braking model; and
generating responsive to the compensated trailer braking control data a compensated trailer braking control signal, the compensated trailer braking control signal for delivery to a modulator valve of the brake control system of the associated towing vehicle 1 that is responsive to the compensated trailer braking control signal to activate brakes on the towed vehicle based on the compensated trailer braking control signal.

18. The non-transient computer readable medium according to claim 17, further comprising:
determining determine default trailer braking control data based on the application trailer configuration data not being received by braking control apparatus by:
applying the primal trailer braking control data representative of the primal trailer braking control signal to the default trailer braking model; and
generating responsive to the default trailer braking control data the default trailer braking control signal for delivery to the modulator valve of the brake control system of the associated towing vehicle that is responsive to the default trailer braking control signal to activate the brakes on the towed vehicle based on the default trailer braking control signal.

19. A non-transient computer readable medium storing instructions thereon that when executed by a processor of a braking control apparatus of a brake control system of an associated towing vehicle performs a method for generating a compensated trailer braking control signal to activate brakes on a towed vehicle being towed by the associated towing vehicle as a combination vehicle, the method comprising:
storing default trailer model data in a non-transient memory device operatively coupled with a processor of a braking control apparatus of the brake control system, the default trailer model data being representative of a default trailer braking model used by the braking control apparatus to generate a default trailer braking control signal used to activate brakes on a default towed vehicle;
executing the control logic by the processor to:
determine an application trailer braking model different than the default trailer braking model based on received application trailer configuration data received by the braking control apparatus representative of an application value of an equipment parameter of the towed vehicle by:
selecting the application trailer braking model different than the default trailer braking model from a plurality of application trailer braking models different than the default trailer braking model stored in the non-transient memory device based on the application trailer configuration data received by the braking control apparatus; and determine compensated trailer braking control data by applying primal trailer braking control data representative of a primal trailer braking control signal to the selected application trailer braking model; and generating, by an output circuit operatively coupled with the processor and being responsive to the compensated trailer braking control data, a compensated trailer braking control signal for delivery to a modulator valve of the brake control system of the brake system of the associated towing vehicle that is responsive to the compensated trailer braking control signal to activate brakes on the towed vehicle based on the compensated trailer braking control signal.

20. The non-transient computer readable medium according to claim 19, wherein:

the selecting the application trailer braking model comprises executing the control logic by the processor to select the application trailer braking model from the plurality of application trailer braking models stored in the non-transient memory device based on:

determining that the application value of the equipment parameter of the towed vehicle represented by the application trailer configuration data is within a first predetermined range.

21. The non-transient computer readable medium according to claim 17, further comprising:

storing a default value of the equipment parameter corresponding to the default trailer model data in the non-transient memory device, wherein the default value of the equipment parameter corresponding to the default trailer model data representative of the default trailer braking model used by the braking control apparatus to generate the default trailer braking signal used to activate brakes on the default towed vehicle having the default value of the equipment parameter, wherein the executing the control logic by the processor comprises executing the control logic by the processor to generate the application trailer braking model based on the default trailer braking model and the application trailer configuration data by:

determining a difference between the default value of the equipment parameter and the application value of the equipment parameter; and modifying the default trailer braking model to generate the application trailer braking model by applying the difference to the default trailer braking model using a modification function.

22. The non-transient computer readable medium according to claim 17, wherein:

the executing the control logic by the processor to generate the application trailer braking model based on the default trailer braking model and the application trailer configuration data comprises:

modifying the default trailer braking model to generate the application trailer braking model by applying the application value of the equipment parameter to the default trailer braking model using a modification function.

23. The non-transient computer readable medium according to claim 17, further comprising:

receiving a manual trailer configuration signal provided by an associated operator of the associated towing vehicle via a controller manual input operatively coupled with the processor, the manual trailer configuration signal comprising the application trailer configuration data representative of the application value of the equipment parameter of the towed vehicle.

24. The non-transient computer readable medium according to claim 17, further comprising:

receiving an automatic trailer configuration signal from an associates source external to the associated combination vehicle and external to the braking control apparatus via a controller automatic input operatively coupled with the processor, the automatic trailer configuration signal comprising the application trailer configuration data representative of the application value of the equipment parameter of the towed vehicle.

* * * * *